US012547909B2

(12) United States Patent
Daruna et al.

(10) Patent No.: US 12,547,909 B2
(45) Date of Patent: Feb. 10, 2026

(54) SYSTEMS FOR THE PREDICTION OF RECURRING DATA ENTRIES, MITIGATION OF RECURRING DATA ENTRIES AND METHODS THEREOF

(71) Applicant: Capital One Services, LLC, McLean, VA (US)

(72) Inventors: Srinivasarao Daruna, Ashburn, VA (US); Vijay Sahebgouda Bantanur, Gaithersburg, MD (US); Maharshi Yogeshkumar Jha, Fairfax, VA (US); Marisa Lee, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 1106 days.

(21) Appl. No.: 17/179,741

(22) Filed: Feb. 19, 2021

(65) Prior Publication Data

US 2022/0269956 A1 Aug. 25, 2022

(51) Int. Cl.
G06F 16/00 (2019.01)
G06F 16/215 (2019.01)
(Continued)

(52) U.S. Cl.
CPC .............. G06N 5/04 (2013.01); G06F 16/215 (2019.01); G06N 20/00 (2019.01)

(58) Field of Classification Search
None
See application file for complete search history.

(56) References Cited

U.S. PATENT DOCUMENTS

2010/0332474 A1* 12/2010 Birdwell ............ G06Q 30/0185
707/E17.089
2015/0039505 A1 2/2015 Jin et al.
(Continued)

FOREIGN PATENT DOCUMENTS

CA 2787933 A1 * 8/2011 ............ G06F 21/554
CA 2791566 C * 9/2018 ......... G06F 16/9566

OTHER PUBLICATIONS

Dreyfuss, "DoNotPay's New Service Automatically Cancels Your Free Trials", Wired, Jul. 17, 2019 <<https://www.wired.com/story/free-trial-card/>>.
(Continued)

Primary Examiner — Bai D Vu
(74) Attorney, Agent, or Firm — Greenberg Traurig, LLP

(57) ABSTRACT

Systems and methods of the present disclosure enable a processor to automatically predict a sequence of recurring data entries by accessing a history of electronic activity and executing a recurring entry classifier model to generate a library of recognized recurring data entries, where each recognized recurring data entry in the library includes: a precursor period associated with a precursor data entry, a recurrence period associated with a recurring value, and a recurring entity identifier. An electronic activity data entry is received and identified as preceding a recurring data entry based on the electronic activity value being a nominal electronic activity value. The electronic activity data entry is matched to a recognized recurring data entry in the library using the entity identifier. The processor notifies a user of the matching sequence of recurring data entries as a sequence of recurring data entries to commence after the precursor period.

20 Claims, 8 Drawing Sheets

(51) Int. Cl.
    *G06N 5/04*         (2023.01)
    *G06N 20/00*      (2019.01)

(56) References Cited

U.S. PATENT DOCUMENTS

| | | | |
|---|---|---|---|
| 2017/0091320 A1* | 3/2017 | Psota | G06F 16/3337 |
| 2020/0074472 A1* | 3/2020 | Adjaoute | G06N 5/048 |
| 2021/0110313 A1* | 4/2021 | Jones | G06F 18/214 |

OTHER PUBLICATIONS

"DoNotPay: Use a Virtual Credit Card for Free Trials", The #1 Virtual Credit Card, Featured in BBC, Wired & Vice; DoNotPay; retrieved Jun. 23, 2020 <<https://donotpay.com/learn/virtual-credit-cards/>>.

Sawers, "DoNotPay Now Lets You Share Online Subscriptions Without Divulging Your Password", VentureBeat, Mar. 9, 2020 <<https://venturebeat.com/2020/03/09/donotpay-now-lets-you-share-online-subscriptions-without-divulging-your-password/>>.

\* cited by examiner

SYSTEMS FOR THE PREDICTION OF RECURRING DATA ENTRIES, MITIGATION OF RECURRING DATA ENTRIES AND METHODS THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based systems configured for the prediction of recurring data entries and the mitigation of incorrect or unwanted recurring data entries, including machine learning models for the prediction of the recurring data entries, and methods thereof.

BACKGROUND OF TECHNOLOGY

Many electronic activities result in recurring instances of the electronic activities and associated recurring data entries. Unintended or intentionally malicious recurrence of data entries can increase the resource requirements of a database and database management system as well as have detrimental effects for users associated with the recurring data entries. Typically, such recurring data entries are addressed after-the-fact. However, such solutions result in resource usage and effects to the user that cannot be reversed.

SUMMARY OF DESCRIBED SUBJECT MATTER

In some embodiments, the present disclosure provides an exemplary technically improved computer-based method that includes at least the following steps of accessing, by at least one processor, an entry history data associated with a plurality of electronic activity performed by a plurality of users; executing, by the at least one processor, a recurring entry classifier model to generate a library of recognized recurring data entries based on feature vectors extracted from each data entry in the entry history data, where each recognized recurring data entry in the library of recognized recurring data entries includes: i) a precursor period associated with a nominal electronic activity value associated with each recognized recurring data entry, ii) a recurrence period associated with a recurring electronic activity value different from the nominal electronic activity value, and iii) a recurring entity identifier identifying a recurring entity associated with each recognized recurring data entry, where the precursor period of each recognized recurring data entry includes an amount of time between a first data entry and a beginning of the recurrence period, where the recurrence period includes an amount of time between each recognized recurring data entry; receiving, by the at least one processor, an electronic activity data entry, where the electronic activity data entry includes: i) an electronic activity date indicating a date of the electronic activity, ii) an electronic activity value representing an amount of the electronic activity, and iii) an entity identifier identifying an entity associated with the electronic activity; identifying, by the at least one processor, the electronic activity data entry as a recurring data entry based on the electronic activity data entry and identify the electronic activity value as the nominal electronic activity value; determining, by the at least one processor, a matching sequence of recurring data entries in the library of recognized recurring data entries based at least in part on the entity identifier matching the recurring entity identifier of the matching sequence of recurring data entries; determining, by the at least one processor, a start date of the recurring data entry based on the precursor period of the matching sequence of recurring data entries and the electronic activity date of the electronic activity data entry; causing to display, by the at least one processor, a recurring entry graphical user interface (GUI) on a computing device associated with a user, the recurring entry GUI including: i) an indication of the recurring data entry, the precursor period, and the start date of the recurring data entry, and ii) a user selectable interface element to accept, decline or schedule future alerts of subsequent recurring data entries using the recurring data entries alert GUI; and determining, by the at least one processor, a loss of the recurring entry classifier model based on a difference between a particular recognized recurring data entry, the electronic activity data entry and a user selection of the user selectable interface element to update model parameters of the recurring entry classifier model.

In some embodiments, the present disclosure provides another exemplary technically improved computer-based method that includes at least the following steps of receiving, by at least one processor, a plurality of electronic activity data entries associated with a plurality of electronic activities, where each electronic activity data entry of the plurality of electronic activity data entries includes: i) an electronic activity date indicating a date of the electronic activity, ii) an electronic activity value representing an amount of the electronic activity, and iii) an entity identifier of an entity associated with the electronic activity; utilizing, by the at least one processor, a recurring entry classifier model to automatically recognize at least one sequence of recurring electronic activity data entries by identifying a subset of electronic activity data entries of the plurality of electronic activity data entries having: i) at least one common entity identifier of the at least one sequence of recurring electronic activity data entries, and ii) at least one common electronic activity value of the at least one sequence of recurring electronic activity data entries, and iii) at least one common day of a month associated with each electronic activity date the at least one sequence of recurring electronic activity data entries; determining, by the at least one processor, at least one precursor electronic activity data entry associated with the at least one sequence of recurring electronic activity data entries based on an electronic activity data entry of the plurality of electronic activity data entries having a nominal electronic activity value and the common entity identifier, where the at least one precursor electronic activity data entry includes at least one preceding electronic activity date preceding the at least one sequence of recurring electronic activity data entries; determining, by the at least one processor, a precursor period for the at least one sequence of recurring electronic activity data entries based on an amount of time between the at least one preceding electronic activity date and at least one first electronic activity date of at least one first electronic activity data entry in the at least one sequence of recurring electronic activity data entries; and generating, by the at least one processor, at least one recognized recurring data entry record in a library of recognized recurring data entries, the at least one recognized recurring data entry record comprising the at least one common entity identifier, the at least one common electronic activity value, the at least one common day of the month and the precursor period.

In some embodiments, the present disclosure provides another exemplary technically improved computer-based system that includes at least the following components of at least one processor in communication with at least one computer readable storage medium having software instructions stored thereon. The at least one processor is configured to execute the software instructions, that when executed, cause the at least one processor to perform steps to: at least one processor configured to execute software instructions, where the software instructions, upon execution, cause the at least one processor to perform steps to: access entry history data associated with a plurality of electronic activity performed by a plurality of users; execute a recurring entry classifier model to generate a library of recognized recurring data entries based on feature vectors extracted from each data entry in the entry history data, where each recognized recurring data entry in the library of recognized recurring data entries includes: i) a precursor period associated with a nominal electronic activity value associated with each recognized recurring data entry, ii) a recurrence period associated with a recurring electronic activity value different from the nominal electronic activity value, and iii) a recurring entity identifier identifying a recurring entity associated with each recognized recurring data entry, where the precursor period of each recognized recurring data entry includes an amount of time between a first data entry and a beginning of the recurrence period, where the recurrence period includes an amount of time between each recognized recurring data entry; receive an electronic activity data entry associated with an electronic activity, where the electronic activity data entry includes: i) an electronic activity date indicating a date of the electronic activity, ii) an electronic activity value representing an amount of the electronic activity, and iii) an entity identifier identifying an entity associated with the electronic activity; identify the electronic activity data entry as a recurring data entry based on the electronic activity data entry and identify the electronic activity value as the nominal electronic activity value; determine a matching sequence of recurring data entries in the library of recognized recurring data entries based at least in part on the entity identifier matching the recurring entity identifier of the matching sequence of recurring data entries; determine a start date of the recurring data entry based on the precursor period of the matching sequence of recurring data entries and the electronic activity date of the electronic activity data entry; cause to display a recurring entry graphical user interface (GUI) on a computing device associated with a user, the recurring entry GUI including: i) an indication of the recurring data entry, the precursor period, and the start date of the recurring data entry, and ii) a user selectable interface element to accept, decline or schedule future alerts of subsequent recurring data entries using the recurring data entries alert GUI; execute a loss function to determine a loss of the recurring entry classifier model based on a difference between a particular recognized recurring data entry, the electronic activity data entry and a user selection of the user selectable interface element; and update model parameters of the when the loss of the recurring entry classifier model has been determined.

In some embodiments, the present disclosure provides the exemplary technically improved computer-based systems and methods that further include where the electronic activity data entry is received from an authorized electronic activities stream.

In some embodiments, the present disclosure provides the exemplary technically improved computer-based systems and methods that further include determining, by the at least one processor, a candidate set of recurring data entries in the library by filtering the recognized recurring data entries in the library based on a comparison of the entity identifier to each recognized recurring data entries entity identifier; and determining, by the at least one processor, the subsequent recurring data entries by filtering the candidate set of recurring data entries based on a comparison of the electronic activity value to each recognized recurring data entries nominal value.

In some embodiments, the present disclosure provides the exemplary technically improved computer-based systems and methods that further include cleansing, by the at least one processor, the entity identifier to produce a normalized entity identifier having a common format to each recognized recurring data entries entity identifier.

In some embodiments, the present disclosure provides the exemplary technically improved computer-based systems and methods that further include determining, by the at least one processor, an electronic activity value holding period including an amount of time between an authorization of the electronic activity value and a cancellation of the electronic activity value; and determining, by the at least one processor, the subsequent recurring data entries by filtering the candidate set of recurring data entries based on a comparison of the electronic activity value to each recognized recurring data entries nominal value and the electronic activity value holding period to a recognized recurring data entries nominal value holding period of each recognized recurring data entries nominal value.

In some embodiments, the present disclosure provides the exemplary technically improved computer-based systems and methods that further include where the user selectable interface element includes a confirmation element selectable by a user to confirm the precursor period and request a reminder.

In some embodiments, the present disclosure provides the exemplary technically improved computer-based systems and methods that further include where the reminder includes an alert message one day prior to an end of the precursor period.

In some embodiments, the present disclosure provides the exemplary technically improved computer-based systems and methods that further include where the nominal electronic activity value includes an authorized charge less than or equal to one dollars.

In some embodiments, the present disclosure provides the exemplary technically improved computer-based systems and methods that further include determining, by the at least one processor, a precursor identification delay upon receiving the electronic activity data entry; and determining, by the at least one processor, the nominal electronic activity value upon the precursor identification delay elapsing without a subsequent electronic activity data entry having the entity identifier and the electronic activity value.

In some embodiments, the present disclosure provides the exemplary technically improved computer-based systems and methods that further include where the precursor identification delay includes fifteen minutes.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
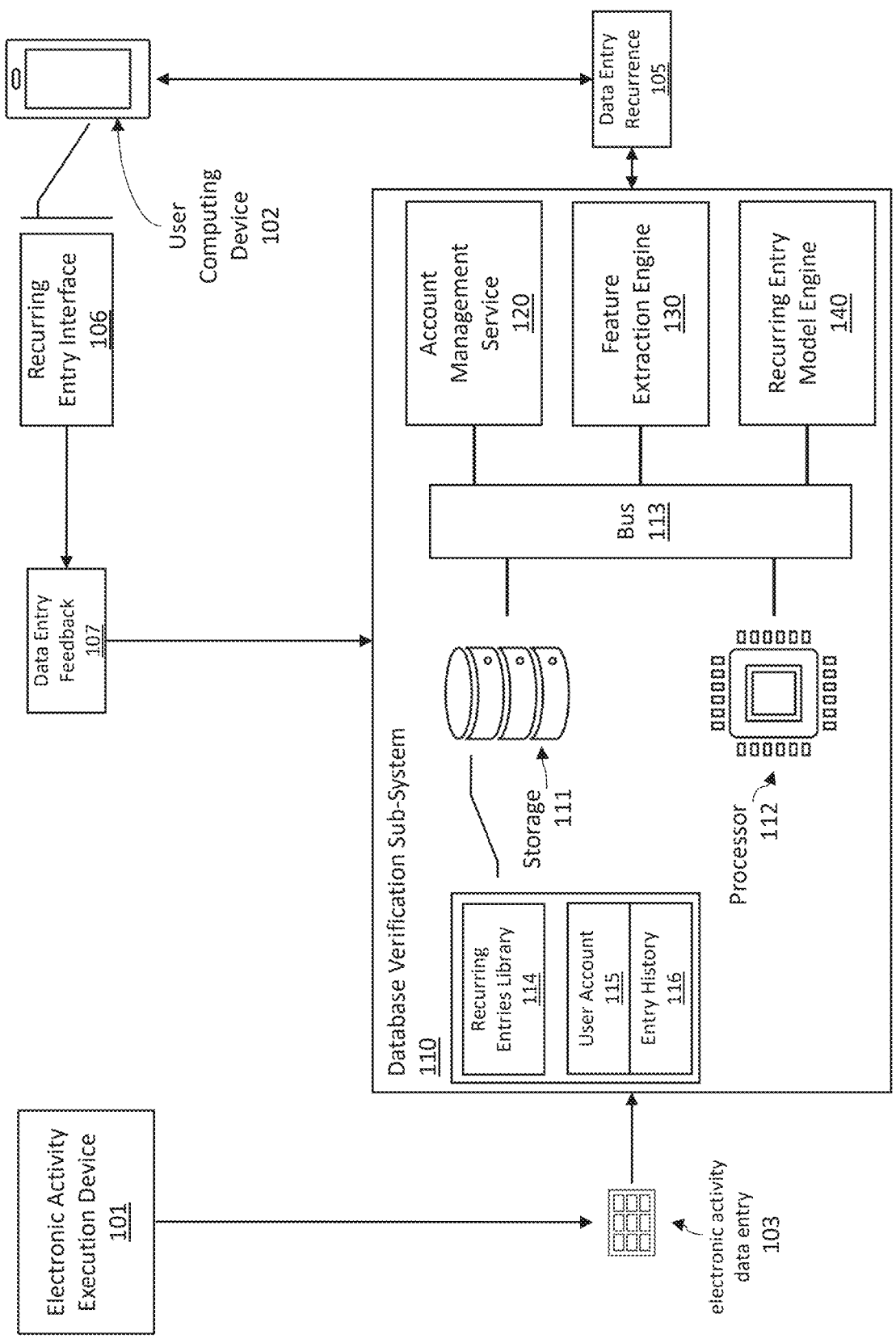
FIGS. 1-8 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 8 illustrate systems and methods of identifying precursor data entries preceding recurring data entries in databases and other storage solutions. The following embodiments provide technical solutions and technical improvements that overcome technical problems, drawbacks and/or deficiencies in the technical fields involving database management, computational resource management and data security. As explained in more detail, below, technical solutions and technical improvements herein include aspects of improved database management systems for data entry analysis to automatically and efficiently predict recurring data entries based on the detection of precursor data entries, including automated capabilities to prevent or otherwise mitigate the recurring data entries to prevent fraudulent, malicious, erroneous, unintentional and other unwanted effects on account integrity, data integrity and security while also reducing dataset size for more efficient resource management of computational resources. Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram of an exemplary computer-based system for the automated detection of precursor data entries for predicting recurring data entries in accordance with one or more embodiments of the present disclosure.

In some embodiments, a database verification sub-system 110 may receive data entries for electronic activities from activity execution devices, such as the electronic activity execution device 101. In some embodiments, the electronic activity execution device 101 may include any computing device from electronic activities are performed or executed, such as, e.g., a terminal, personal computer or mobile computing device for performing Internet-based and application-based activities (e.g., account logins, account information changes, online purchases, instant message communications, social media posts, among others and combinations thereof).

In some embodiments, the electronic activity execution device 101 may include a physical terminal for performing electronic transactions, such as, e.g., a point-of-sale device, automated teller machine (ATM) or other device. As a result of a user executing electronic activities via the electronic activity execution device 101, data entries may be produced for entry into the user's user account 115. For example, the electronic activity execution device 101 may produce an electronic activity data entry 103.

In some cases, the electronic activity data entry 103 may be a precursor to a recurring sequence of electronic activities resulting in a recurring sequence of electronic activity data entries. Such a recurring sequence may be unwanted or incorrect duplication of data entries. This duplication requires additional communication resources, processing resource, database resources, as well as multiplying the effect on the user's user account 115, often to the detriment of the user. Thus, such duplicate data entries may pose a technical problem for computation efficiency of account management and database management systems, as well as a threat to account security, data integrity and user preferences. Accordingly, the database verification sub-system 110 is employed to monitor electronic activity data entries from the electronic activity execution device 101, as well as additional electronic activity execution devices to predict and identify electronic activity data entries that precede recurring sequences.

In some embodiments, the database verification sub-system 110 may be a part of the electronic activity execution device 101. Thus, the database verification sub-system 110 may include hardware and software components including, e.g., electronic activity execution device 101 hardware and software, cloud or server hardware and software, or a combination thereof.

In some embodiments, the database verification sub-system 110 may include hardware components such as a processor 112, which may include local or remote processing components. In some embodiments, the processor 112 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 112 may include data-processing capacity provided by the microprocessor. In some embodiments, the microprocessor may include memory, processing, interface resources, controllers, and counters. In some embodiments, the microprocessor may also include one or more programs stored in memory.

Similarly, the database verification sub-system 110 may include storage 111, such as local hard-drive, solid-state drive, flash drive, database or other local storage, or remote storage such as a server, mainframe, database or cloud provided storage solution. For example, the data storage solution may include database technology such as, e.g., a centralized or distributed database, cloud storage platform, decentralized system, server or server system, among other storage systems. In some embodiments, the data storage solution may, additionally or alternatively, include one or more data storage devices such as, e.g., a hard drive, solid-state drive, flash drive, or other suitable storage device. In some embodiments, the data storage solution may, additionally or alternatively, include one or more temporary storage devices such as, e.g., a random-access memory, cache, buffer, or other suitable memory device, or any other data storage solution and combinations thereof.

In some embodiments, the term "database" refers to an organized collection of data, stored, accessed or both electronically from a computer system. The database may include a database model formed by one or more formal design and modeling techniques. The database model may include, e.g., a navigational database, a hierarchical database, a network database, a graph database, an object database, a relational database, an object-relational database, an entity-relationship database, an enhanced entity-relationship database, a document database, an entity-attribute-value database, a star schema database, or any other suitable database model and combinations thereof. For example, the database may include database technology such as, e.g., a centralized or distributed database, cloud storage platform, decentralized system, server or server system, among other storage systems. In some embodiments, the database may, additionally or alternatively, include one or more data storage devices such as, e.g., a hard drive, solid-state drive, flash drive, or other suitable storage device. In some embodiments, the database may, additionally or alternatively, include one or more temporary storage devices such as, e.g., a random-access memory, cache, buffer, or other suitable memory device, or any other data storage solution and combinations thereof.

In some embodiments, the database verification sub-system 110 may implement computer engines for extracting data attributes and characteristics of the electronic activity data entry 103 to predict whether the electronic activity data entry 103 precedes a sequence of recurring electronic activity data entries as a result of, e.g., unintentional, unwanted, malicious, fraudulent or other cause of duplicate data entries to the user's user account 115. Accordingly, in some embodiments, the computer engines may include an account management service 120 to manage and utilize account histories of the user and recurring entries library 114, a feature extraction engine 130 to extract the attributes and characteristics, and a recurring entry model engine 140 to analyze the extracted attributes and characteristics based on training according to the account histories. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, to predict the recurring data entries, the database verification sub-system 110 may include computer engines including, e.g., the account management service 120, the feature extraction engine 130 and the recurring entry model engine 140. In some embodiments, the account management service 120 may receive the electronic activity data entry 103 and identify an associated user account 115, e.g., stored in the storage 111. In some embodiments, the account management service 120 may extract data items from the electronic activity data entry 103 including, e.g., a user identifier associated with the electronic activity data entry 103, a third-party entity identifier associated with the electronic activity data entry 103, an activity type identifier, an activity value or activity quantity, a time data item, a location data item, a date data item, a device type or device identifier associated with the electronic activity execution device 101, an activity description, or other data items representing characteristics of the electronic activity data entry 103.

For example, in some embodiments, the electronic activity data entry 103 may include a transaction-related activity, such as a transaction record (e.g., transaction authorization request, posted transaction, etc.). In such an example, the data items may include, e.g., a transaction value, a transaction type, an account identifier or a user identifier or both, a merchant identifier, a transaction authorization date, a transaction post date, a transaction location, among other transaction data.

In some embodiments, to match the electronic activity data entry 103 to user account 115, the account management service 120 may compare the user identifier or account identifier to user identifiers or account identifiers of user accounts 115 in the storage 111. Using, e.g., an index or database query or other method of searching the storage 111, the account management service 120 may access the associated user account 115 to access electronic activity records for the user, including, e.g., an entry history 116. In some embodiments, the entry history 116 may include data entries for electronic activities associated with the account.

Accordingly, in some embodiments, the account management service 120 may receive the electronic activity data entry 103 for recordation in the entry history 116 of the user account 115. In some embodiments, recording the electronic activity data entry 103 enables comparison of attributes and characteristics to filter parameters in order to determine whether the electronic activity data entry 103 is a precursor to recurring data entries.

In some embodiments, the account management service 120 may examine attributes of the electronic activity data entry 103 to determine whether it is a candidate precursor data entry. In some embodiments, precursor data entries may have a set of attributes that conform to particular behaviors. For example, a precursor data entry may have an attribute of an electronic activity value that includes a nominal or zero value. In the example of transaction records, a nominal value may include, e.g., a value in the range of one cent to one dollar. The nominal value may be any suitable value to justify the data entry without impacting the user account 115. In some embodiments, the account management service 120 may check the electronic activity data entry 103 to determine whether the electronic activity value is a nominal or a zero value.

In some embodiments, the account management service 120 may also compare an entity identifier of the electronic activity data entry 103 to a whitelist of entities for whom recurring data entries are recognized to occur. In some embodiments, where the electronic activity value is a nominal or a zero value, the entity identifier identifies an entity in the whitelist, or both, the account management service 120 may identify the electronic activity data entry 103 as a candidate precursor data entry.

In some embodiments, the account management service 120 may instead or in addition employ a precursor data entry machine learning model to identify whether the electronic activity data entry 103 is a candidate precursor data entry. For example, in some embodiments, a classification model may be employed to correlate attributes of the electronic activity data entry 103 to a classification as a precursor or not a precursor. In some embodiments, the classification model may utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the precursor data entry machine learning model may be trained against known precursor data entries using attributes such as, e.g., a user identifier associated with each data entry, a third-party entity identifier associated with each data entry, an activity type identifier, an activity value or activity quantity, a time data item, a location data item, a date data item, a device type or device identifier associated with the electronic activity execution device, or other attributes as input features. Based on an error in predicting the classification of the known precursor data entries, the precursor data entry machine learning model may be trained to automatically recognize candidate precursor data entries from new electronic activity data entries, such as the electronic activity data entry 103, according to the associated attributes.

In embodiments, where the electronic activity data entry 103 is identified as a candidate precursor data entry, the account management service 120 may utilize a library of recurring data entries, or recurring entries library 114, to identify a matching sequence of recurring data entries to the electronic activity data entry 103. In some embodiments, the recurring entries library 114 may include parameters associated with recognized recurring data entries. Each recognized recurring data entry may be associated with a sequence of recurring data entries having common characteristics and attributes signifying a sequence of recurring electronic activities. For example, the sequence of recurring electronic activities may include, e.g., purchase subscriptions (e.g., streaming media or recurring product purchase subscriptions), periodic scheduled data back-ups to a cloud service, periodic data downloads, periodic automated updates to web pages or applications, or other recurring electronic activities. As a result, each data entry in a sequence of recurring data entries may include, e.g., a common entity associated with each data entry in the sequence, a common electronic activity type and common electronic activity value, a common day of each period (e.g., week, month, quarter, year, etc.), among other commonalities of attributes across the data entries in the sequence of recurring data entries.

Therefore, in some embodiments, the account management service 120 may compare attributes of the electronic activity data entry 103 to attributes of each sequence of recurring data entries in the recurring entries library 114. In some embodiments, where the attributes of the electronic activity data entry 103 matches the attributes of a sequence of recurring data entries recognized in the recurring entries library 114, the account management service 120 may determine that the electronic activity data entry 103 is a precursor data entry to a sequence of recurring data entries.

In some embodiments, the account management service 120 may determine whether the attributes of the electronic activity data entry 103 matches a particular recognized sequence of recurring data entries based on a comparison of set of attributes. In some embodiments, the attributes may include, e.g., entity identifier, electronic activity type, electronic activity value of the precursor data entry, among other attributes. In some embodiments, each attribute may be represented in the electronic activity data entry 103 in a format dissimilar to the format of the attributes in the recurring entries library 114. Thus, in some embodiments, the account management service 120 may first normalize the attributes of the electronic activity data entry 103.

In some embodiments, the term "normalize" and its logical and/or linguistic relatives and/or derivatives, refers to a process of structuring data in a database according to a format for associated data, e.g., data tables, tuples, and/or arrays, that is common for each entry of data. In some embodiments, data in a database can be normalized to, e.g., remove redundant information, facilitate comparison of data fields between different data entries, reduce data anomalies, and facilitate uniform storage, processing and retrieval of data entries, among other uses. Accordingly, in some embodiments, the account management service 120 may convert the attributes of the electronic activity data entry 103 to have a structure and format that matches the structure and format of the attributes represented in the recurring entries library 114.

In some embodiments, the account management service 120 may utilize an exact match to identify a recognized sequence of recurring data entries in the recurring entries library as matching to the electronic activity data entry 103. By using exact match filtering, the account management service 120 may quickly and efficiently identify which, if any, recognized sequences of recurring data entries match the electronic activity data entry. In some embodiments, an exact match may be too strict due to minor variations in attributes (e.g., different spellings or values of the entity identifier, among other variations). Accordingly, to mitigate the risk of false negatives, in some embodiments, the account management service 120 may compare the attributes of the electronic activity data entry 103 to the attributes of the recurring entries library 114 by employing, e.g., a suitable similarity measurement. In some embodiments, the measure of similarity may include, e.g., an exact match or a predetermined similarity score according to, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure. The predetermined similarity score may be any suitable similarity score according to the type of electronic activity to identify a measured attribute of any two data entries as the same.

In some embodiments, similarity may be measured between each individual attribute separately, and the respective similarity scores summed, averaged, or otherwise combined to produce a measure of similarity of two data entries.

In some embodiments, the similarity may instead or in addition be measured for a combination of the device identifier, device type identifier and location identify. For example, a hash or group key may be generated by combining the device identifier, device type identifier and location identify. The hash may include a hash functioning take as input each of attribute or a subset of attributes of a particular data entry. The group key may be produced by creating a single string, list, or value from combining each of, e.g., a string, list or value representing each individual attribute of the particular data entry. The similarity between two data entries may then be measured as the similarity between the associated hashes and/or group keys. The measured similarity may then be compared against the predetermined similarity score to determine candidate data entries that are candidates as matching to each other.

In some embodiments, where a matching sequence of recurring data entries in the recurring entries library 114 is identified, the account management service 120 may determine that the electronic activity data entry 103 is a precursor data entry to a prospective or future sequence of recurring data entries as a result of a prospective or future sequence of recurring electronic activities.

In some embodiments, the matching sequence of recurring data entries may include a data record in the recurring entries library 114 specifying a recognized recurring data entry. In some embodiments, the data record may include, e.g., characteristics of a precursor period preceding the start of the sequence of recurring data entries associated with the recognized recurring data entries. For example, the recurring entries library 114 may record in the data record precursor period attributes such as, e.g., precursor period duration among others, as well as sequence attributes such as, e.g., electronic activity value of each data entry in the sequence of recurring data entries, entity identifier associated with each data entry in the sequence of recurring data entries, recurrence period associated with each data entry in the sequence of data entries, among other sequence attributes.

In some embodiments, based on the data record, the account management service 120 may identify the precursor period duration associated with the electronic activity data entry 103. In some embodiments, as a result of the precursor period duration and the electronic activity data of the electronic activity data entry 103, the account management service 120 may determine an end date of the precursor period, a start date of the recurring data entries, or both. As a result, the account management service 120 may formulate a prediction of a data entry recurrence 105 based on the electronic activity data entry 103 and the precursor period.

In order to implement the account management service 120, the account management service 120 may be implemented as one or more computer engines that may include software components, hardware components, or a combination thereof. For example, each computer engine may include a dedicated processor and storage. However, in some embodiments, the computer engines share hardware resources, including the processor 112 and storage 111 of the database verification sub-system 110 via, e.g., a bus 113. Thus, the account management service 120 may include a memory including software and software instructions, such as, e.g. machine learning models and/or logic for accessing, manipulating, modifying and adding to a user account 115 stored in the storage 111.

In some embodiments, upon prediction of the data entry recurrence 105, the database verification sub-system 110 may notify a user of the data entry recurrence 105, e.g., via a user computing device 102. In some embodiments, the user computing device 102 may be any suitable computing device, such as, e.g., a laptop computer, desktop computer, tablet, smartphone, smartwatch, or other computing device including mobile devices, wearables, et cetera.

In some embodiments, the database verification sub-system 110 may generate a notification including the prediction of the data entry recurrence 105 to deliver to the user computing device 102. For example, the notification may include, e.g., an email, a simple message service (SMS) message, a multi-media message service (MMS) message, a rich communication service (RCS) message, an internet messaging message (e.g., Apple iMessage, WhatsApp, Facebook Messenger, Signal, Telegram, Skype, or other internet-based messaging service), social media message, telephone call, or any other suitable messaging technique. In some embodiments, the notification may be an application notification, such as, e.g., a push notification from an application associated with the database verification sub-system 110 (e.g., a banking application, social media application, or other suitable application). Therefore, the user computing device 102 may be configured to produce a recurring entry interface 106 in response to the data entry recurrence 105, including, e.g., the notification of the prediction, as well as user selectable interface elements to address the prediction of the data entry recurrence 105.

In some embodiments, where the data entry recurrence 105 is identified, the data entry recurrence 105 may indicate that the electronic activity data entry 103 is a precursor to a sequence of recurring electronic activity data entries that may be mitigated before taking effect. In some embodiments, the notification of the data entry recurrence 105 may include, e.g., attributes identifying the electronic activity of the electronic activity data entry 103, such as, e.g., the entity associated with the electronic activity, the date, the activity execution device 101, among other attributes. Additionally, the notification may include, e.g., an interface element representing the precursor period and the end of the precursor period when the recurring data entries are predicted to commence. For example, the interface element may include, e.g., a days-left counter, a start date indicator, a progress indicator depicting a timeline of the precursor period and where along the timeline a current date is, or other suitable interface element for conveying the end of the precursor period and the start of the recurring electronic activity data entries.

As a result, the user may respond to the alert of the data entry recurrence 105 to, e.g., proactively dispute the data entry recurrence 105, select a link associated with the entity of the electronic activity data entry 103 to proactively cancel the data entry recurrence 105, or otherwise take proactive action to prevent the effects of recurring data entries on the storage 111 and the user account 115.

In some embodiments, the recurring entry interface 106 may be generated and displayed once in response to the electronic activity data entry 103. In some embodiments, the recurring entry interface 106 may be reproduced as a reminder at predetermined times in the precursor period to remind the user to address the prospective sequence of recurring electronic activity data entries. For example, the recurring entry interface 106 may be reproduced, e.g., at the start of the precursor period, on the last day of the precursor period, on a day before the last day of the precursor period, a week before the last day of the precursor period, or at any other suitable time in the precursor period to remind the user before the recurring electronic activity data entries are projected to commence.

In some embodiments, the user computing device 102 may include a software application or program that include functionality to detect the receipt of the data entry recurrence 105 and produce the recurring entry interface 106 in response. In some embodiments, the data entry recurrence 105 includes functionality to cause the user computing device 102 to display the recurring entry interface 106. For example, the notification of the data entry recurrence 105 may include a link that, upon selection, may automatically generate an internet-based request to dispute or cancel the electronic activity data entry 103 or proactively dispute or cancel the sequence of recurring electronic activity data entries. In another example, the user computing device 102 may include an application associated with the database verification sub-system 110 that may generate and display the recurring entry interface 106 automatically in response to the data entry recurrence 105.

In some embodiments, the recurring entry interface 106 may include user interface elements that provide details of the data entry recurrence 105 to the user. For example, the recurring entry interface 106 may identify the electronic activity data entry 103 associated with the data entry recurrence 105, the third-party entity associated with the electronic activity data entry 103, a date of the electronic activity data entry 103, a time of the electronic activity data entry 103, a location of the electronic activity data entry 103, a value or quantity of the electronic activity data entry 103, among other suitable information. In some embodiments, accompanying the information may be a user-selectable interface element providing one-click functionality to dispute the recurrence of data entries after the precursor period on the grounds of the data entry recurrence 105. Selection of this one-click interface element may produce a data entry feedback 107 and issue the data entry feedback 107 to the database verification sub-system 110.

In some embodiments, the data entry feedback 107 may include, e.g., a dispute of the electronic activity data entry 103 to indicate that the electronic activity data entry 103 was incorrectly entered (e.g., as a result of a mistake, fraud, error, or other cause). In some embodiments, the dispute may include, e.g., a user selection of the attribute or attributes of the electronic activity data entry 103 that are incorrect and/or a user selection of correct attributes of the electronic activity data entry 103. In some embodiments, the data entry feedback 107 may include, e.g., a confirmation to confirm the validity of the electronic activity data entry 103.

In some embodiments, the user computing device 102 may issue the data entry feedback 107 by communicating the data entry feedback 107 to the database verification sub-system 110. In some embodiments, the data entry feedback 107 may trigger in the database verification sub-system 110, e.g., by the account management service 120, a process to dispute the electronic activity data entry. In some embodiments, the dispute may automatically invalidate the electronic activity data entry 103 and remove the electronic activity data entry 103 from the entry history 116 of the user account 115. In some embodiments, the dispute may also send a request to the electronic activity execution device 101 to modify or correct the electronic activity data entry 103, or any other suitable response to the feedback 107. Accordingly, the database verification sub-system 110 may enable users to quickly and efficiently correct errors and fraud in electronic activities, including correcting errors and fraud ahead of the entry of recurring electronic activity data entries via the real-time efficient automatic detection precursor data entries to produce a prediction and notification of data entry recurrence 105.

In some embodiments, the database verification subsystem 110 may update the recurring entries library 114 based on, e.g., manual input by an administrator, or using automated techniques to recognize and record sequences of recurring data entries. In some embodiments, such automated techniques may include employing a machine learning model. as a result, the database verification sub-system 110 may employ a feature extraction engine 130 and a recurring entry model engine 140 to implement a machine learning model to automatically recognize and record sequences of recurring data entries. In some embodiments, the training for the machine learning model may utilize activity histories in accounts, including the entry history 116 in the user account 115. In some embodiments, the machine learning model may be automatically trained in an online fashion, such as feedback to predictions is used to further train the model.

In some embodiments, the feature extraction engine 130 may employ the electronic activity data entry 103 for online learning by extracting features for use by the recurring entry classifier model to determine whether the electronic activity data entry 103 is a precursor to a sequence of recurring data entries. To do so, in some embodiments, the feature extraction engine 130 may extract attributes and characteristics to formulate features for use in a machine learning model to recognize duplicate data entries based on prior user behaviors in disputing duplicate data entries.

Accordingly, in some embodiments, the feature extraction engine 130 may extract data items such as, e.g., a user identifier associated with each data entry, a third-party entity identifier associated with each data entry, an activity type identifier, an activity value or activity quantity, a time data item, a location data item, a date data item, a device type or device identifier associated with the electronic activity execution device 101, an activity description, or other attributes representing characteristics of each data entry. For example, in some embodiments, the feature extraction engine 130 may examine metadata associated with each electronic activity data entry 103 to identify, e.g., location, date, time, entity or device identifiers, entity and/or device type, a value or quantity, an activity operation and/or operation type, associated data fraud or security checks among other attributes and characteristics associated with the electronic activity data entry 103. However, in some embodiments, one or more of the attributes and characteristics may be explicitly specified in the electronic activity data entry 103 or, e.g., in the user account 115. In some embodiments, the electronic activity data entry 103 may each also specify, e.g., the user identifier, third-party entity identifier, the activity value or activity quantity, the activity type, the activity operation, among other data attributes and characteristics and combinations thereof.

In some embodiments, the feature extraction engine 130 may also extract features from a history of electronic activities, e.g., accessed via the entry history 116 of the user account 115 associated with the electronic activity data entry 103. Using the history, the feature extraction engine 130 may generate training data for training a machine learning model to predict whether the electronic activity data entry 103 is likely to be a precursor data entry to a sequence of recurring data entries according to the extracted features. Accordingly, similar to the attributes and characteristics of the electronic activity data entry 103, the feature extraction engine 130 may extract from each data entry in the history features including, e.g., location, date, time, entity or device identifiers, entity and/or device type, a value or quantity, an activity operation and/or operation type, associated data fraud or security checks among other attributes and characteristics associated with each data entry and combinations thereof.

In some embodiments, the feature extraction engine 130 may encode the features extracted from activity records (e.g., the electronic activity data entry 103, past data entries in the entry history 116 among others) into a feature vector. In some embodiments, the feature vector may include a one-dimensional vector of values representing each extracted feature. Accordingly, the feature vector may be efficiently ingested by a machine learning model for prediction.

In order to implement the feature extraction engine 130, the feature extraction engine 130 may be implemented as one or more computer engines that may include software components, hardware components, or a combination thereof. For example, each computer engine may include a dedicated processor and storage. However, in some embodiments, the computer engines share hardware resources, including the processor 112 and storage 111 of the database verification sub-system 110 via, e.g., a bus 113. Thus, the feature extraction engine 130 may include a memory including software and software instructions, such as, e.g. generating and determining attributes characterizing the attributes and characteristics of the electronic activity data entry 103.

In some embodiments, the recurring entry model engine 140 may ingest the feature vector produced by the feature extraction engine 130, e.g., by receiving the feature vector via the bus 113, or directly from the feature extraction engine 130. In some embodiments, the feature vector can include features from electronic activity data entries in the entry history 116 or other dataset. Using such features, a machine learning model, such as a recurring entry classifier model, may be trained to predict a determination of whether the electronic activity data entry 103 precedes a sequence of recurring data entries based on the training.

In some embodiments, the entry history 116 may be used to construct a training set of electronic activity data entries having recurring attributes on regular periods of time. The recurring attributes may be used to construct training labels for precursor data entries that are dated prior to each sequence of data entries having the recurring attributes. Thus, feature vectors for each electronic activity data entry can be ingested by the machine learning model for prediction, and the prediction may be compared against the training label for each electronic activity data entry to determine a loss with which to train the machine learning model.

In some embodiments, based on the training, the recurring entry model engine 140 may predict, e.g., a prediction of a sequence of recurring data entries following the electronic activity data entry 103. In some embodiments, the prediction may be, e.g., a classification of, e.g., a recurring data entry sequence, e.g., including a precursor period prediction, a start date prediction, among other classifications based on the electronic activity data entry 103. Accordingly, the recurring entry model engine 140 may employ, e.g., a classifier model, or other suitable machine learning model or combination thereof.

In some embodiments, the recurring entry model engine 140 may be configured to utilize one or more exemplary AI or machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values, functions and aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, regression or classifier models may produce a numerical output. For example, a classifier may produce a numerical probability between 0.0 and 1.0 representing, e.g., a probability of the sequence of recurring data entries. Accordingly, to form a determination of whether the electronic activity data entry 103 precedes the sequence of recurring data entries, the recurring entry model engine 140 may compare the probability of the sequence of recurring data entries to a probability threshold, where a probability greater than the probability threshold indicates a prediction of data entry recurrence 105. Alternatively, the probability may indicate a probability of no sequence of recurring data entries. Accordingly, the probability of no the sequence of recurring data entries exceeding the probability threshold would indicate a prediction of no the sequence of recurring data entries for an electronic activity, and the probability of no the sequence of recurring data entries being below the probability threshold would indicate the prediction of data entry recurrence 105.

In order to implement the recurring entry model engine 140, the recurring entry model engine 140 may be implemented as one or more computer engines that may include software components, hardware components, or a combination thereof. For example, each computer engine may include a dedicated processor and storage. However, in some embodiments, the computer engines share hardware resources, including the processor 112 and storage 111 of the database verification sub-system 110 via, e.g., a bus 113. Thus, the recurring entry model engine 140 may include a memory including software and software instructions, such as, e.g. machine learning models and/or logic for predicting whether the user-specified data items of the electronic activity data entry 103 are correct based on learning user behavior.

In some embodiments, upon prediction of the data entry recurrence 105, the database verification sub-system 110 may receive the feedback 107 from the user computing device 102. The feedback 107 may be utilized to train the recurring entry classifier model based on a difference between the feedback 107 and the predicted sequence of recurring data entries of the data entry recurrence 105.

Figure 2:
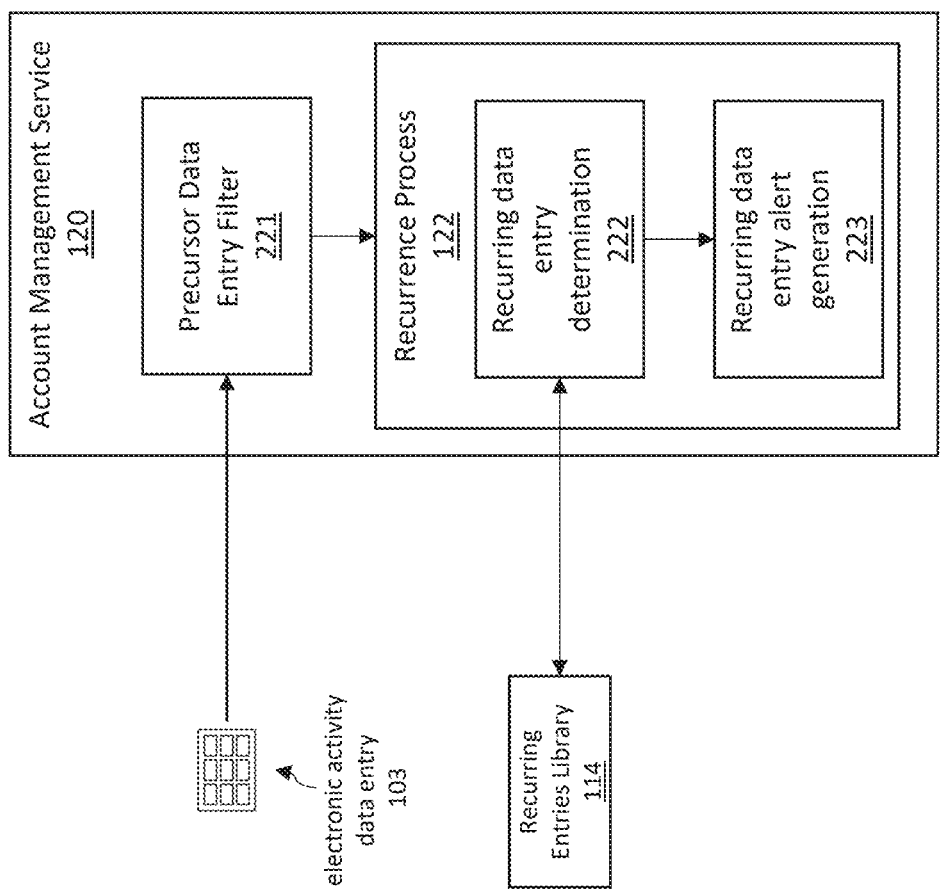

FIG. 2 is a block diagram of another exemplary computer-based system including an account management service for the automated detection of precursor data entries for predicting recurring data entries in accordance with one or more embodiments of the present disclosure.

In some embodiments, a precursor data entry filter 221 of the account management service 120 may receive the electronic activity data entry 103 from an electronic activities data stream. In some embodiments, the precursor data entry filter 221 may check attributes and characteristics of the electronic activity data entry 103 against filter parameters in order to determine whether the electronic activity data entry 103 is a precursor to recurring data entries.

In some embodiments, the precursor data entry filter 221 may examine attributes of the electronic activity data entry 103 to determine whether it is a candidate precursor data entry. In some embodiments, precursor data entries may have a set of attributes that conform to particular behaviors. For example, a precursor data entry may have an attribute of an electronic activity value that includes a nominal or zero value. In the example of transaction records, a nominal value may include, e.g., a value in the range of one cent to one dollar. The nominal value may be any suitable value to justify the data entry without impacting the user account 115. In some embodiments, the precursor data entry filter 221 may check the electronic activity data entry 103 to determine whether the electronic activity value is a nominal or a zero value.

In some embodiments, the precursor data entry filter 221 may also compare an entity identifier of the electronic activity data entry 103 to a whitelist of entities for whom recurring data entries are recognized to occur. In some embodiments, where the electronic activity value is a nominal or a zero value, the entity identifier identifies an entity in the whitelist, or both, the precursor data entry filter 221 may identify the electronic activity data entry 103 as a candidate precursor data entry.

In some embodiments, upon identifying the electronic activity data entry 103 as the candidate precursor data entry, the precursor data entry filter 221 may initialize a recurrence process 122. In some embodiments, the account management service 120 may be configured to initialize and execute the recurrence process 122 locally. But in some embodiments, the recurrence process 122 may be called via, e.g., an API call, such as a recurrence API.

In some embodiments, the recurrence process 122 may include a step functionality for recurring data entry determination 222. In some embodiments, the recurring data entry determination 222 may In embodiments, where the electronic activity data entry 103 is identified as a candidate precursor data entry, the recurring data entry determination 222 may utilize a library of recurring data entries, or recurring entries library 114, to identify a matching sequence of recurring data entries to the electronic activity data entry 103. In some embodiments, the recurring entries library 114 may include parameters associated with recognized recurring data entries. Each recognized recurring data entry may be associated with a sequence of recurring data entries having common characteristics and attributes signifying a sequence of recurring electronic activities. For example, the sequence of recurring electronic activities may include, e.g., purchase subscriptions (e.g., streaming media or recurring product purchase subscriptions), periodic scheduled data back-ups to a cloud service, periodic data downloads, periodic automated updates to web pages or applications, or other recurring electronic activities. As a result, each data entry in a sequence of recurring data entries may include, e.g., a common entity associated with each data entry in the sequence, a common electronic activity type and common electronic activity value, a common day of each period (e.g., week, month, quarter, year, etc.), among other commonalities of attributes across the data entries in the sequence of recurring data entries.

Therefore, in some embodiments, the recurring data entry determination 222 may compare attributes of the electronic activity data entry 103 to attributes of each sequence of recurring data entries in the recurring entries library 114. In some embodiments, where the attributes of the electronic activity data entry 103 matches the attributes of a sequence of recurring data entries recognized in the recurring entries library 114, the recurring data entry determination 222 may determine that the electronic activity data entry 103 is a precursor data entry to a sequence of recurring data entries.

In some embodiments, the recurring data entry determination 222 may determine whether the attributes of the electronic activity data entry 103 matches a particular recognized sequence of recurring data entries based on a comparison of set of attributes. In some embodiments, the attributes may include, e.g., entity identifier, electronic activity type, electronic activity value of the precursor data entry, among other attributes. In some embodiments, each attribute may be represented in the electronic activity data entry 103 in a format dissimilar to the format of the attributes in the recurring entries library 114. Thus, in some embodiments, the recurring data entry determination 222 may first normalize the attributes of the electronic activity data entry 103.

In some embodiments, the term "normalize" and its logical and/or linguistic relatives and/or derivatives, refers to a process of structuring data in a database according to a format for associated data, e.g., data tables, tuples, and/or arrays, that is common for each entry of data. In some embodiments, data in a database can be normalized to, e.g., remove redundant information, facilitate comparison of data fields between different data entries, reduce data anomalies, and facilitate uniform storage, processing and retrieval of data entries, among other uses. Accordingly, in some embodiments, the recurring data entry determination 222 may convert the attributes of the electronic activity data entry 103 to have a structure and format that matches the structure and format of the attributes represented in the recurring entries library 114.

In some embodiments, the recurring data entry determination 222 may utilize an exact match to identify a recognized sequence of recurring data entries in the recurring entries library as matching to the electronic activity data entry 103. By using exact match filtering, the recurring data entry determination 222 may quickly and efficiently identify which, if any, recognized sequences of recurring data entries match the electronic activity data entry. In some embodiments, an exact match may be too strict due to minor variations in attributes (e.g., different spellings or values of the entity identifier, among other variations). Accordingly, to mitigate the risk of false negatives, in some embodiments, the recurring data entry determination 222 may compare the attributes of the electronic activity data entry 103 to the attributes of the recurring entries library 114 by employing, e.g., a suitable similarity measurement. In some embodiments, the measure of similarity may include, e.g., an exact match or a predetermined similarity score according to, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure. The predetermined similarity score may be any suitable similarity score according to the type of electronic activity to identify a measured attribute of any two data entries as the same.

In some embodiments, similarity may be measured between each individual attribute separately, and the respective similarity scores summed, averaged, or otherwise combined to produce a measure of similarity of two data entries. In some embodiments, the similarity may instead or in addition be measured for a combination of the device identifier, device type identifier and location identify. For example, a hash or group key may be generated by combining the device identifier, device type identifier and location identify. The hash may include a hash functioning take as input each of attribute or a subset of attributes of a particular data entry. The group key may be produced by creating a single string, list, or value from combining each of, e.g., a string, list or value representing each individual attribute of the particular data entry. The similarity between two data entries may then be measured as the similarity between the associated hashes and/or group keys. The measured similarity may then be compared against the predetermined similarity score to determine candidate data entries that are candidates as matching to each other.

In some embodiments, the similarity measurement and/or exact match may be employed to filter records of recurring data entries in the recurring entries library 114. In some embodiments, filtering the records according to the entity identifier of the electronic activity data entry 103 may result in a candidate set of recurring data entries, while filtering the candidate set according to the electronic activity value including the nominal value of the electronic activity data entry 103 may facilitate determining the matching sequence of recurring data entries that matches the electronic activity data entry 103. However, in some embodiments, filtering by the electronic activity value and then by entity identifier may be performed instead. Additionally, more attributes may be employed to further filter the records of recurring data entries in the recurring entries library 114.

In some embodiments, where a matching sequence of recurring data entries in the recurring entries library 114 is identified, the recurring data entry determination 222 may determine that the electronic activity data entry 103 is a precursor data entry to a prospective or future sequence of recurring data entries as a result of a prospective or future sequence of recurring electronic activities.

In some embodiments, the matching sequence of recurring data entries may include a data record in the recurring entries library 114 specifying a recognized recurring data entry. In some embodiments, the data record may include, e.g., characteristics of a precursor period preceding the start of the sequence of recurring data entries associated with the recognized recurring data entries. For example, the recurring entries library 114 may record in the data record precursor period attributes such as, e.g., precursor period duration among others, as well as sequence attributes such as, e.g., electronic activity value of each data entry in the sequence of recurring data entries, entity identifier associated with each data entry in the sequence of recurring data entries, recurrence period associated with each data entry in the sequence of data entries, among other sequence attributes.

In some embodiments, based on the data record, the recurrence process 122 may utilize the data record precursor period attributes to identify data for an alert to a user using a recurring entry generation 223. In some embodiments, the data record for the matching sequence of recurring data entries may include attributes such as, e.g., the precursor period duration, the electronic activity value holding period (e.g., such as in a holding funds for a transaction) associated with the nominal value, the electronic activity value of the matching sequence of recurring data entries, the recurrence period of the recurring data entries, among other attributes and combinations thereof.

In some embodiments, based on the attributes of the data records, the recurring entry generation 223 may determine a start date of the recurring data entries following the electronic activity data entry 103. In some embodiments, the start date is determined based on a date that is occurring upon the precursor period duration following the electronic activity date of the electronic activity data entry 103. Accordingly, by adding the precursor period duration to the electronic activity start date, the end of the precursor period and start of the sequence of recurring data entries may be determined.

Similarly, in some embodiments, the electronic activity value holding period is determined based on a date and/or time that occurs upon the electronic activity value holding period following the electronic activity date and/or time of the electronic activity data entry 103. Accordingly, by adding the electronic activity value holding period to the electronic activity start date and/or time, the end of the electronic activity value holding period may be determined.

In some embodiments, using the precursor period duration, end of the precursor period, start of the sequence of recurring data entries, and electronic activity value holding period, among other data, attributes and characteristics, the recurring entry generation 223 may generate a recurring entry graphical user interface (GUI), such as the recurring entry interface 106 described above. In some embodiments, the recurring entry generation 223 may cause the recurring entry GUI to be displayed by, e.g., the user computing device 102 associated with the user. In some embodiments, the recurring entry GUI may include interface elements indicating, e.g., the prediction of a sequence of recurring data entries following the electronic activity data entry 103, the precursor period, the precursor period duration, the end date of the precursor period, a start date of the sequence of recurring data entries, an electronic activity value hold period of the electronic activity data entry 103, an recurrence period of the sequence of recurring data entries, a recurring electronic activity value of each data entry of the sequence of recurring data entries, an entity identifier of the sequence of recurring data entries, among other information and combinations thereof.

In some embodiments, the recurring entry GUI may also include user-selectable interface elements, such as, e.g., elements to enable selection to confirm or decline the alert, confirm or dispute the electronic activity data entry 103, confirm or dispute the predicted sequence of recurring data entries or attributes thereof, among other user-selectable interface elements.

Figure 3:
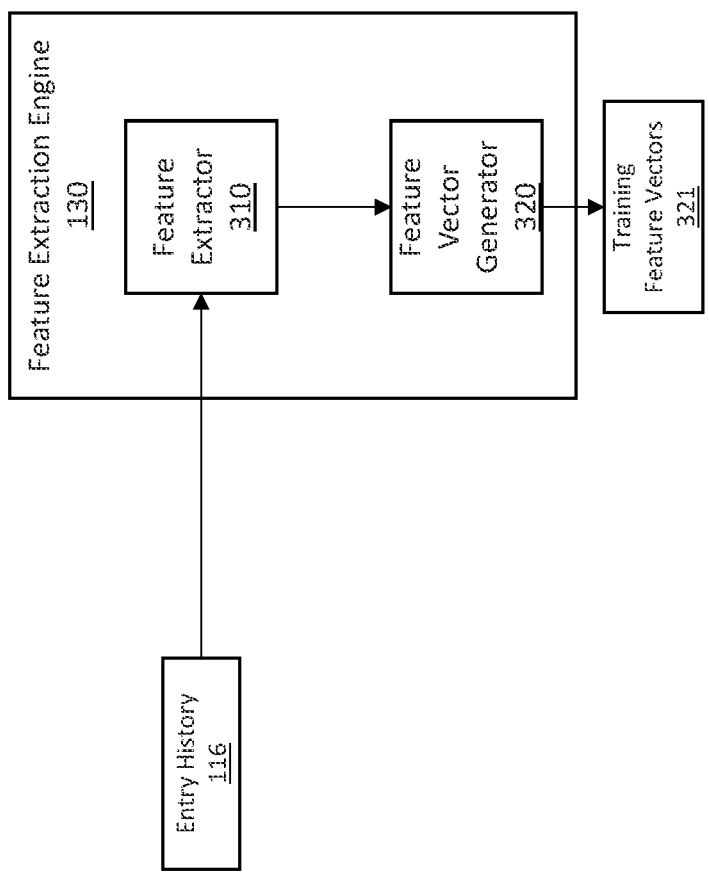

FIG. 3 is a block diagram of another exemplary computer-based system including a feature extraction engine for the automated detection of precursor data entries for predicting recurring data entries in accordance with one or more embodiments of the present disclosure.

In some embodiments, the feature extractor 310 identifies and extracts attributes of the electronic activity data entry 103. In some embodiments, the attributes are relevant to the determination of a predicted sequence of recurring data entries based on a history of confirmed sequences of recurring data entries. In some embodiments, the relevant attributes can be predefined according to, e.g., selection by an administrative user administering the feature extraction engine 130, or other suitable method for determining predefined attributes to extract. In some embodiments, the predefined attributes can be adjusted at any time, e.g., by the administrative user, or may be fixed.

In some embodiments, examples of relevant attributes may include, e.g., location, date, time, entity or device identifiers, entity and/or device type, a value or quantity, an activity operation and/or operation type, an entity history of duplicated data entries (e.g., frequency or other metric) associated data fraud or security checks among other attributes and characteristics predictive of whether any given data entry indicates a future sequence of recurring data entries. In some embodiments, for example, the electronic activity may include a payment transaction with two data entries entered into the entry history 116 requesting or authorizing payment. Relevant attributes for such a transaction that may be predictive of a subscription, which may include, e.g., merchant name, merchant type (e.g., merchant category code (MCC)), transaction amount, time of transaction, date of transaction, location of transaction, transaction mode (online versus swipe, for example), point-of-sale entry and mode, fraud check results, merchant history of subscriptions, among other suitable attributes and combinations thereof.

In some embodiments, the feature extractor 310 may include dynamic or learned attributes predictive of a data entry recurrence. For example, a statistical model may be employed for, e.g., univariate selection, a correlation matrix with heatmap, or other suitable statistical model for feature selection. In an example, the model is a machine learning model for selecting attributes according to feature importance, such as, e.g., a suitable feature selection classifier, or other suitable machine learning model for feature importance.

In some embodiments, the attributes may be encoded into a feature vector 321 by a feature vector generator 320. In some embodiments, the feature vector 321 may be configured for ingestion by a machine learning model to produce a recurring data entry classification that indicates whether a sequence of recurring data entries will follow the electronic activity data entry 103. Accordingly, the feature vector generator 320 may encode each attribute into a numerical encoding. For example, attributes that already have a numerical value may have a numerical encoding equivalent to the numerical value, while attributes that include character strings or other non-numerical data types can be converted to a numerical value. In some embodiments, attributes with non-numerical data types may include, e.g., location, date, entity or device identifiers, entity and/or device type, an activity operation and/or operation type, data fraud or security check results among other attributes and characteristics. These attributes may be converted to numerical values using, e.g., a per-character numerical assignment to each character of the attribute, a numerical label based on predefined assignments of attributes to a numerical value (e.g., each merchant category code having a particular assigned numerical value to represent each merchant category code) or other suitable encoding technique.

In some embodiments, the feature vector generator 320 may generate a vector representation of the relationship between the electronic activity data entry 103 according to the encoded attributes. The vector representation of the relationship may include, e.g., an n-dimensional vector, such as a one dimensional vector. For example, the vector representation may include a one dimensional vector having a length corresponding to the number of the selected attributes. The encoding of each attribute may then be recorded in a predefined index location in the one dimensional vector to produce the feature vector 321 representative of the selected relevant attributes.

Figure 4:
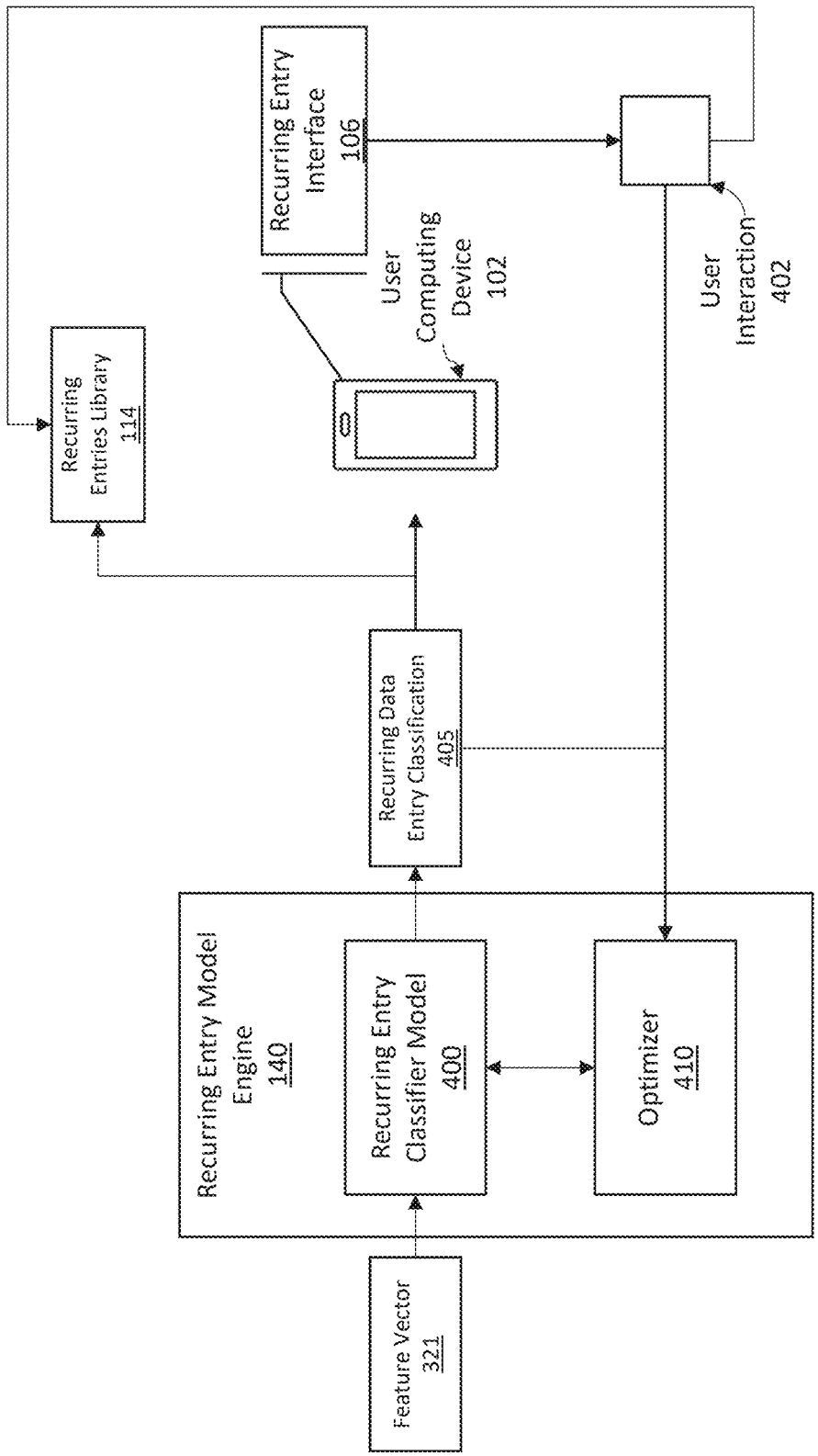

FIG. 4 is a block diagram of another exemplary computer-based system including a recurring entry model engine for the automated detection of precursor data entries for predicting recurring data entries in accordance with one or more embodiments of the present disclosure.

In some embodiments, the recurring entry model engine 140 may utilize the recurring entry classifier model 400 to predict a recurring data entry classification 405 for the feature vector 321 associated with the user's account, e.g., the feature vector 321 as described above with reference to FIG. 3.

In some embodiments, the recurring entry classifier model 400 ingests the feature vector 321 and produces a prediction of a recurring data entry classification 405 for each feature vector 321. In some embodiments, to produce this prediction, the recurring entry classifier model 400 may include a machine learning model including a classification model, such as, e.g., a convolutional neural network (CNN), a Naive Bayes classifier, decision trees, random forest, support vector machine (SVM), K-Nearest Neighbors, or any other suitable algorithm for a classification model. In some embodiments, for computational efficiency while preserving accuracy of predictions, the recurring entry classifier model 400 may advantageously include a random forest classification model Accordingly, the recurring entry classifier model 400 ingests a feature vector 321 and processes the attributes encoded therein using the classification model to produce a model output vector. In some embodiments, the model output vector may be decoded to generate a label including the recurring data entry classification 405.

In some embodiments, the model output vector may include or may be decoded to reveal a numerical output, e.g., a probability value between 0 and 1. In some embodiments, the probability value may indicate a degree of probability that the electronic activity data entry 103 of the feature vector 321 precedes a sequence of recurring data entries. In some embodiments, the recurring entry classifier model 400 may test the probability value against a probability threshold, where a probability value greater than the probability threshold indicates, e.g., that the electronic activity data entry 103 precedes a sequence of recurring data entries, or that the electronic activity data entry 103 does not precede a sequence of recurring data entries. For example, the probability threshold can be, e.g., greater than 0.5, greater than 0.6, greater than 0.7, greater than 0.8, greater than 0.9, or other suitable threshold value. In some embodiments, the recurring entry classifier model 400 may produce the recurring data entry classification 405 based on the probability value and the probability threshold. For example, the recurring data entry classification 405 may include a classification as a recurring data entry where the probability value is greater than the probability threshold. However, the recurring entry classifier model 400 may configured such that the recurring data entry classification 405 may include a classification as not a recurring data entry where the probability value is greater than the probability threshold.

Moreover, in some embodiments, the model output vector may include or may be decoded to reveal a classification regarding attributes of the sequence of recurring data entries. For example, the model output vector may include, e.g., a prediction for a classification of the precursor period, precursor period duration, precursor period end data, sequence start date, sequence recurrence period, recurring data entry electronic activity value, among other attributes of the sequence of recurring data entries predicted to follow the electronic activity data entry 103.

In some embodiments, where the recurring data entry classification 405 includes a classification label of duplicative data entries for the feature vector 321, the recurring data entry classification 405 may be provided to the user computing device 102, e.g., as a prediction of the data entry recurrence 105 described above with reference to FIG. 1. In some embodiments, the recurring data entry classification 405 of the data entry recurrence 105 may trigger the user computing device 102 to generate and display the recurring entry interface 106. In some embodiments, the recurring entry interface 106 includes a depiction or representation of, e.g., the electronic activity data entry 103, the electronic activity attributes, an indication that data entry precedes a sequence of recurring data entries, at time and/or date at which the sequence of recurring data entries commences or a precursor period duration preceding the commencement of the sequence of recurring data entries, or a combination thereof, as well as an interface element to confirm or deny the recurring data entry classification 405, including the prediction of the sequence, as well as the predictions of the sequence attributes. For example, the user may input a user interaction 402 with an option to confirm the recurring data entry classification 405 as correct or deny the recurring data entry classification 405 as incorrect or adjust attributes to correct the recurring data entry classification 405. In some embodiments, the user interaction 402 may include a user selection of a confirm option or a deny option relative to the recurring data entry classification 405.

For example, in some embodiments, the recurring entry interface 106 may provide user selectable interface elements for, e.g., an option for users to opt in to be reminded about the precursor period end date, e.g., such as by scheduling when to be reminded. When a user opts in to be reminded, that data may be captured and, e.g., cached or otherwise stored with reference to the user account 115 with the database verification sub-system 110. In some embodiments, as a result, the database verification sub-system 110 may schedule a processing job to check for all reminders due for each day and trigger a reminder notification to the respective customers on the day for which the reminders are scheduled, e.g., including the user associated with the recurring data entry classification 405.

An example according to aspects of some embodiments may include the recurring entry classifier model 400 generating recurring data entry classification 405 prediction(s) for free trial period subscription transaction records as the precursor and/or recurring data entries, respectively. Accordingly, in such an example, transaction features for one or more transaction records are extracted, e.g., using the feature extraction engine 130 described above, including, e.g., merchant name, merchant type (e.g., merchant category code (MCC)), transaction amount, time of transaction, date of transaction, location of transaction, transaction mode (online versus swipe, for example), point-of-sale entry and mode, fraud check results, merchant history of subscriptions, among other suitable attributes and combinations thereof. As a result, one or more feature vectors 321 are generated based on the extracted transaction features.

In some examples, the merchant may employ particular practice(s) for initiating a free trial period, such as, e.g., issuing a zero dollar or less than one dollar initial transaction authorization request, and subsequently cancelling the authorization request, issuing a first transaction authorization request and shortly thereafter (e.g., within 0 and 5 minutes, 0 and 10 minutes, 0 and 20 minutes or other similarly suitable time period), issuing a second transaction authorization request, such as for a negative amount to reimburse the first transaction authorization request, or any other practice for validation a payment method without charging money. Accordingly, various combinations of free trial period initiation can be whitelisted and/or recorded in a library associated with particular merchants. In addition, or instead of, the recurring entry classifier model 400 may be trained using the entry history 116 including historical transaction records for recurring transactions (e.g., subscriptions), to train classifier parameters to recognize precursor transaction(s) for merchants that is/are indicative of a free trial period prior to recurring subscription payments. Accordingly, the recurring entry classifier model 400 may ingest the feature vector(s) 321 for one or more transaction records to predict a classification of whether a particular transaction record is a precursor (free trial) transaction record prior to a subscription to a service (e.g., media subscriptions such as print or magazine subscriptions, streaming music, audio, video, video games, etc. or service subscriptions such as subscription groceries, delivery services, cleaning services, etc.).

In some examples, the prediction may include one or more free trial characteristics such as, e.g., a label identifying the transaction record as signaling a free trial period, a free trial period length or end date, a subscription start date, a subscription price, a subscription period, one or more of multiple subscription period options (e.g., 7 days, 10 days, 14 days, 21 days, 30 days, etc.), among other learned outputs and combinations thereof. In some examples, one or more free trial characteristics may be determined using, e.g., a library or look-up-table according to the recurring data entry classification 405 and/or one or more transaction features.

In some examples, the recurring data entry classification 405 may include a determination that a given transaction record signals a free trial period. In some embodiments, based on the free trial characteristics and the recurring data entry classification 405, the recurring entry interface 106 may produce a notification of, e.g., the free trial period, the subsequent subscription, and the free trial period end date, the subscription start date, among other information and combinations thereof. In some embodiments, this information may also be, e.g., cached or otherwise stored with reference to the user account 115 for reminder notifications to the recurring data entry classification 405. For example, the database verification sub-system 110 may re-issue the recurring data entry classification 405 at the free trial period end date, at one or more predetermined times prior to the free trial period end date (e.g., one day before, two days before, three days before, one week before, etc.), or a combination thereof.

In the free trial example, the recurring entry interface 106 may provide user selectable interface elements for, e.g., an option for users to opt in to reminders about the free trial end, e.g., such as by scheduling when to be reminded. When user opts in for the reminder, that data will be captured and, e.g., cached or otherwise stored with reference to the user account 115 with the database verification sub-system 110 as described above. As a result, the database verification sub-system 110 may schedule a job to check for all reminders due for a given day and trigger a reminder notification to the respective customers, e.g., including the user associated with the recurring data entry classification 405.

In some embodiments, the user interaction 402 may also include a lack of a selection. For example, the user may choose to ignore the alert of the recurring entry interface 106, e.g., by selecting an "ignore" element, or by not providing any selection at all. In some embodiments, where the user ignores the recurring entry interface 106, the lack of selection may be interpreted as a command to not take action for the recurring data entry classification 405. Where the recurring data entry classification 405 includes a classification of the sequence of recurring data entries and/or attributes thereof, a command to not take action may represent a confirmation that the recurring data entry classification 405 is correct. Accordingly, the user interaction 402 may include an indication of a confirmation or denial of the recurring data entry classification 405 based on the user's lack of interaction.

In some embodiments, in the case of the lack of any selection, the user interaction 402 may be determined to be an ignore interaction after a predetermined period of time has elapsed without any user selection. For example, the optimizer 410 may include a timer that starts upon generation of the recurring data entry classification 405 and ends upon the predetermined time period elapsing. Alternatively, or in addition, the user computing device 102 and/or recurring entry interface 106 may include the timer that starts upon receiving the recurring data entry classification 405. In some embodiments, the predetermined period of time may include any suitable time period for user interaction with the recurring entry interface 106, such as, e.g., 15 seconds, 30 seconds, 40 seconds, 40 seconds, 45 seconds, 1 minute, 3 minutes, 5 minutes, or any other suitable time period.

In some embodiments, the recurring entry classifier model 400 may trained based on the recurring data entry classification 405 and the user interaction 402. Based on the difference between the recurring data entry classification 405 and the user interaction 402, the parameters of the classification model of the recurring entry classifier model 400 may be updated to improve the accuracy of the recurring data entry classification.

In some embodiments, training is performed using the optimizer 410. In some embodiments, the recurring data entry classification 405 fed back to the optimizer 410. The optimizer 410 may also ingest the user interaction 402, such as feedback 107 described above. In some embodiments, the optimizer 410 may employ a loss function, such as, e.g., Hinge Loss, Multi-class SVM Loss, Cross Entropy Loss, Negative Log Likelihood, or other suitable classification loss function. The loss function determines an error based on the user interaction 402 and the recurring data entry classification 405. In some embodiments, the optimizer 410 may, e.g., backpropagate the error to the recurring entry classifier model 400 to update the parameters using, e.g., gradient descent, heuristic, convergence or other optimization techniques and combinations thereof.

In some embodiments, the optimizer 410 may therefore train the parameters of the recurring entry classifier model 400 to approximate user behaviors in disputing data entries as duplicative based on feedback including the user interaction 402. As a result, the recurring entry classifier model 400 may be continually trained and optimized based on user feedback.

Figure 5:
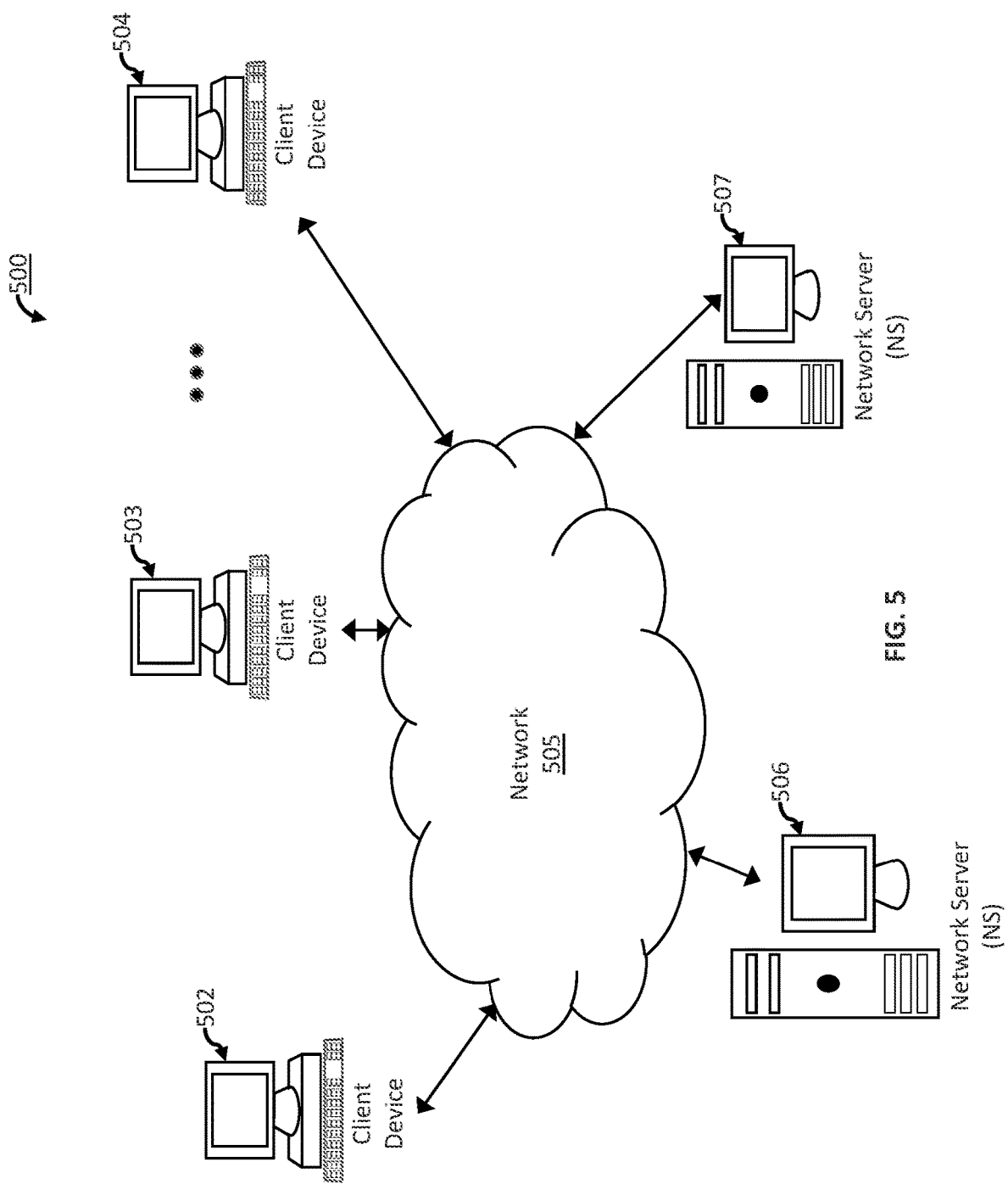

FIG. 5 depicts a block diagram of an exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 500 may be configured to manage a large number of members and concurrent transactions, as detailed herein. In some embodiments, the exemplary computer-based system and platform 500 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 5, member computing device 502, member computing device 503, through member computing device 504 (e.g., clients) of the exemplary computer-based system and platform 500 may include virtually any computing device capable of receiving and sending a message over a network (e.g., cloud network), such as network 505, to and from another computing device, such as servers 506 and 507, each other, and the like. In some embodiments, the member computing devices 502-504 may be personal computers, multiprocessor systems, microprocessor-based or programmable consumer electronics, network PCs, and the like. In some embodiments, one or more member computing devices within member computing devices 502-504 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member computing devices within member computing devices 502-504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member computing devices within member computing devices 502-504 may include may run one or more applications, such as Internet browsers, mobile applications, voice calls, video games, videoconferencing, and email, among others. In some embodiments, one or more member computing devices within member computing devices 502-504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member computing devices 502-504 may be specifically programmed by either Java, .Net, QT, C, C++ and/or other suitable programming language. In some embodiments, one or more member computing devices within member computing devices 502-504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 505 may also include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Microsoft Windows Server, Novell NetWare, or Linux. In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 501-504.

In some embodiments and, optionally, in combination of any embodiment described above or below, for example, one or more exemplary computing member computing devices 502-504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
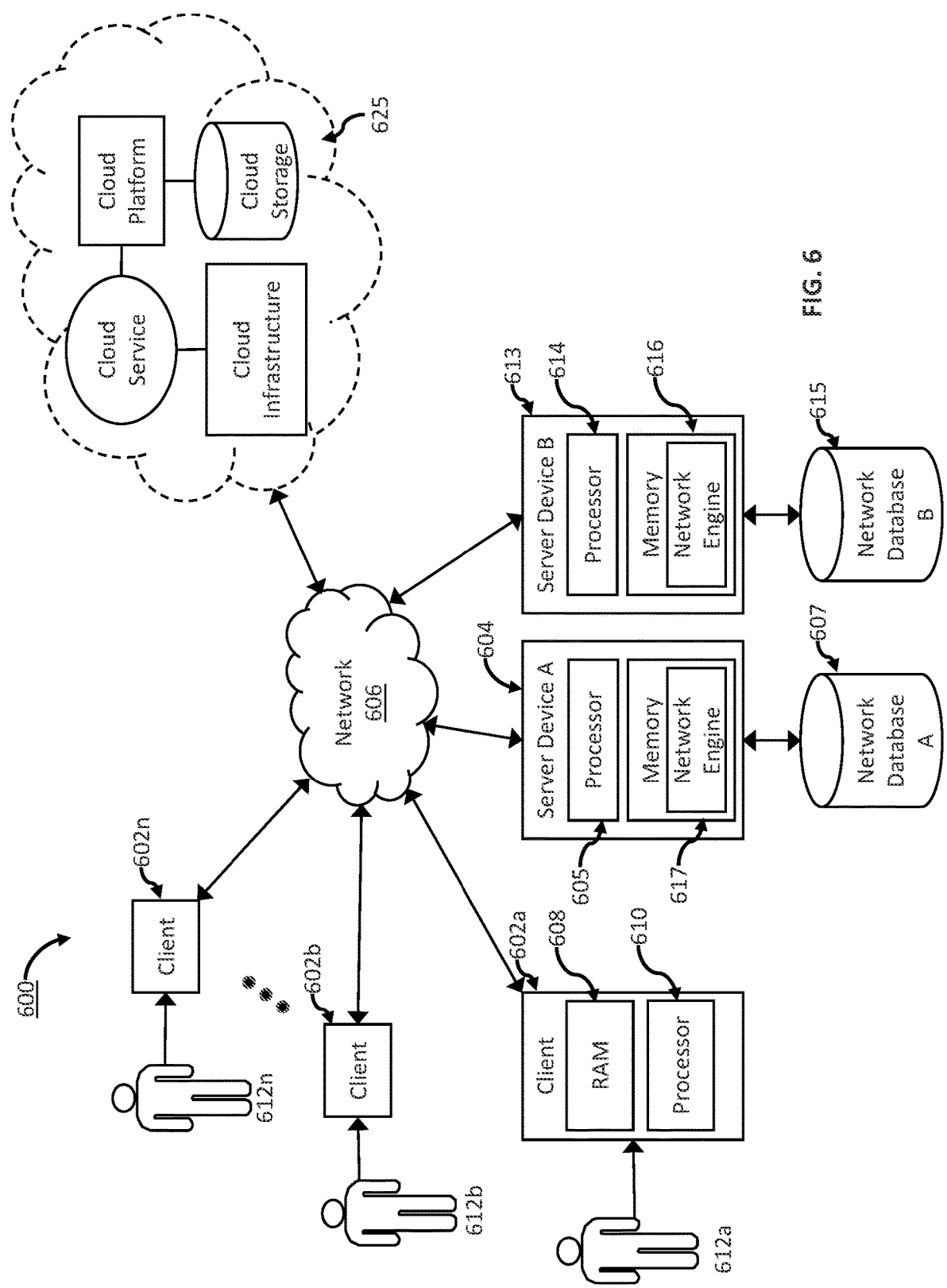

FIG. 6 depicts a block diagram of another exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 602a, member computing device 602b through member computing device 602n shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of member computing device 602a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Scala, NodeJS, Perl, JavaScript, and etc.

In some embodiments, member computing devices 602a through 602n may also comprise a number of external or internal devices such as a mouse, a CD-ROM, DVD, a physical or virtual keyboard, a display, or other input or output devices. In some embodiments, examples of member computing devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing devices 602a through 602n may be specifically programmed with one or more application programs in accordance with one or more principles/methodologies detailed herein. In some embodiments, member computing devices 602a through 602n may operate on any operating system capable of supporting a browser or browser-enabled application, such as Microsoft™ Windows™, and/or Linux. In some embodiments, member computing devices 602a through 602n shown may include, for example, personal computers executing a browser application program such as Microsoft Corporation's Internet Explorer™, Apple Computer, Inc.'s Safari™, Mozilla Firefox, and/or Opera. In some embodiments, through the member computing devices 602a through 602n, user 612a, user 612b through user 612n, may communicate over the exemplary network 606 with each other and/or with other systems and/or devices coupled to the network 606. As shown in FIG. 6, exemplary server devices 604 and 613 may include processor 605 and processor 614, respectively, as well as memory 617 and memory 616, respectively. In some embodiments, the server devices 604 and 613 may be also coupled to the network 606. In some embodiments, one or more member computing devices 602a through 602n may be mobile clients.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from DynamoDB, Redis, Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
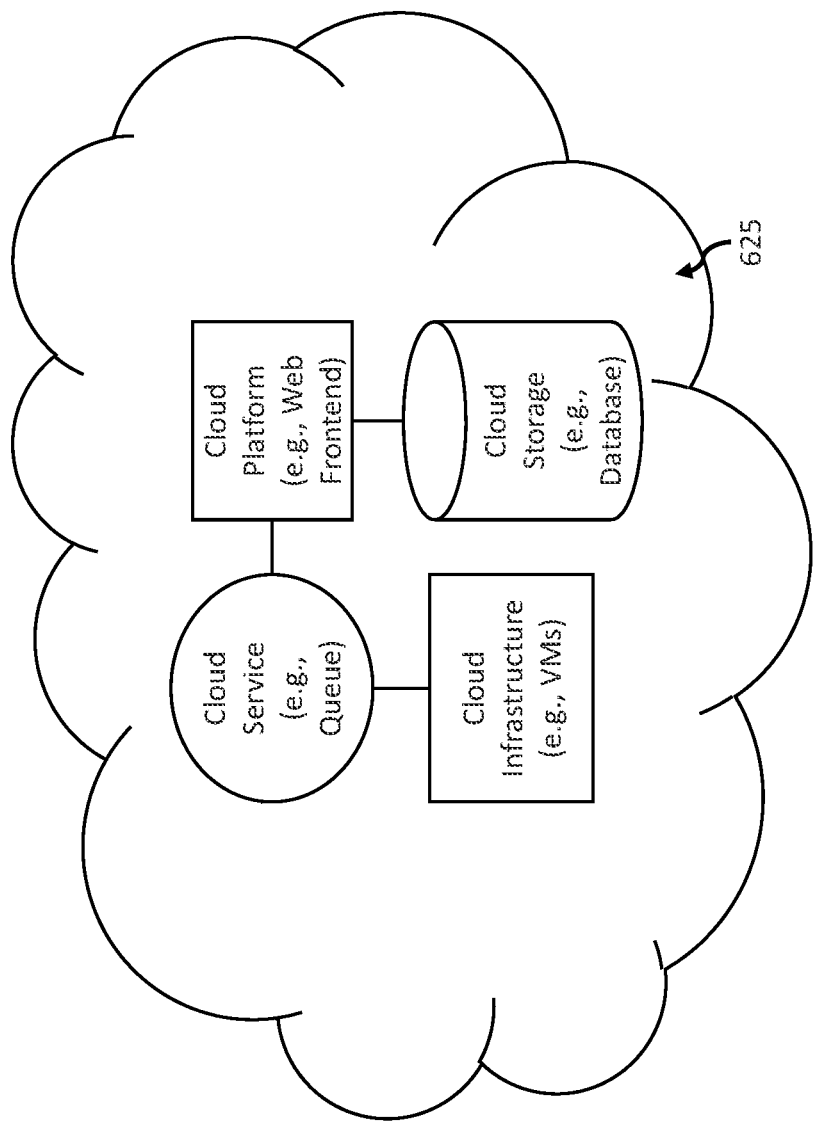
Figure 8:
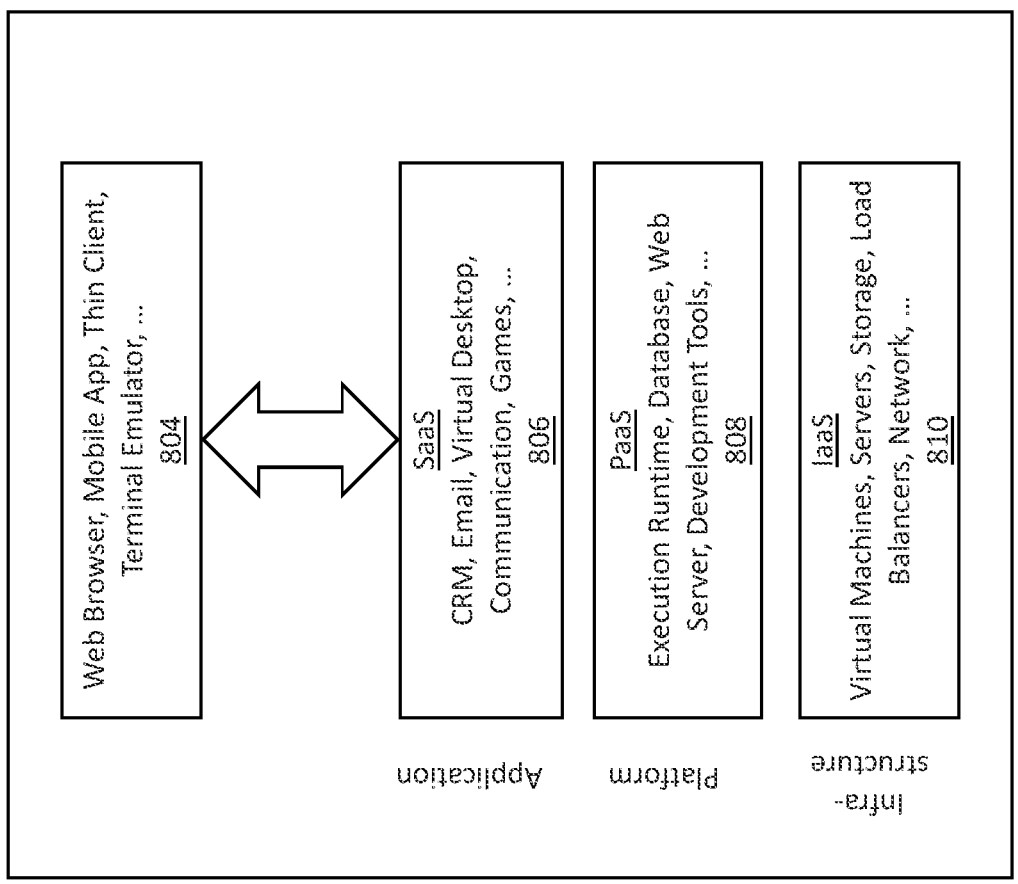

In some embodiments, the exemplary inventive computer-based systems/platforms, the exemplary inventive computer-based devices, and/or the exemplary inventive computer-based components of the present disclosure may be specifically configured to operate in a cloud computing/architecture 625 such as, but not limiting to: infrastructure a service (IaaS) 810, platform as a service (PaaS) 808, and/or software as a service (SaaS) 806 using a web browser, mobile app, thin client, terminal emulator or other endpoint 804. FIGS. 7 and 8 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Scala, NodeJS, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein, and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

At least some aspects of the present disclosure will now be described with reference to the following numbered clauses.

1. A method comprising:
  accessing, by at least one processor, an entry history data associated with a plurality of electronic activity performed by a plurality of users;
  executing, by the at least one processor, a recurring entry classifier model to generate a library of recognized recurring data entries based on feature vectors extracted from each data entry in the entry history data;
    wherein each recognized recurring data entry in the library of recognized recurring data entries comprises:
      i) a precursor period associated with a nominal electronic activity value associated with each recognized recurring data entry,
      ii) a recurrence period associated with a recurring electronic activity value different from the nominal electronic activity value, and
      iii) a recurring entity identifier identifying a recurring entity associated with each recognized recurring data entry;
    wherein the precursor period of each recognized recurring data entry comprises an amount of time between a first data entry and a beginning of the recurrence period;
    wherein the recurrence period comprises an amount of time between each recognized recurring data entry;
  receiving, by the at least one processor, an electronic activity data entry;
    wherein the electronic activity data entry comprises:
      i) an electronic activity date indicating a date of the electronic activity,
      ii) an electronic activity value representing an amount of the electronic activity, and
      iii) an entity identifier identifying an entity associated with the electronic activity;

identifying, by the at least one processor, the electronic activity data entry as a recurring data entry based on the electronic activity data entry and identify the electronic activity value as the nominal electronic activity value;

determining, by the at least one processor, a matching sequence of recurring data entries in the library of recognized recurring data entries based at least in part on the entity identifier matching the recurring entity identifier of the matching sequence of recurring data entries;

determining, by the at least one processor, a start date of the recurring data entry based on the precursor period of the matching sequence of recurring data entries and the electronic activity date of the electronic activity data entry;

causing to display, by the at least one processor, a recurring entry graphical user interface (GUI) on a computing device associated with a user, the recurring entry GUI comprising:
i) an indication of the recurring data entry, the precursor period, and the start date of the recurring data entry, and
ii) a user selectable interface element to accept, decline or schedule future alerts of subsequent recurring data entries using the recurring data entries alert GUI; and determining, by the at least one processor, a loss of the recurring entry classifier model based on a difference between a particular recognized recurring data entry, the electronic activity data entry and a user selection of the user selectable interface element to update model parameters of the recurring entry classifier model.

2. A method comprising:
receiving, by at least one processor, a plurality of electronic activity data entries associated with a plurality of electronic activities;
wherein each electronic activity data entry of the plurality of electronic activity data entries comprises:
i) an electronic activity date indicating a date of the electronic activity,
ii) an electronic activity value representing an amount of the electronic activity, and
iii) an entity identifier of an entity associated with the electronic activity;

utilizing, by the at least one processor, a recurring entry classifier model to automatically recognize at least one sequence of recurring electronic activity data entries by identifying a subset of electronic activity data entries of the plurality of electronic activity data entries having:
i) at least one common entity identifier of the at least one sequence of recurring electronic activity data entries, and
ii) at least one common electronic activity value of the at least one sequence of recurring electronic activity data entries, and
iii) at least one common day of a month associated with each electronic activity date the at least one sequence of recurring electronic activity data entries;

determining, by the at least one processor, at least one precursor electronic activity data entry associated with the at least one sequence of recurring electronic activity data entries based on an electronic activity data entry of the plurality of electronic activity data entries having a nominal electronic activity value and the common entity identifier;
wherein the at least one precursor electronic activity data entry comprises at least one preceding electronic activity date preceding the at least one sequence of recurring electronic activity data entries;

determining, by the at least one processor, a precursor period for the at least one sequence of recurring electronic activity data entries based on an amount of time between the at least one preceding electronic activity date and at least one first electronic activity date of at least one first electronic activity data entry in the at least one sequence of recurring electronic activity data entries;

generating, by the at least one processor, at least one recognized recurring data entry record in a library of recognized recurring data entries, the at least one recognized recurring data entry record comprising the at least one common entity identifier, the at least one common electronic activity value, the at least one common day of the month and the precursor period.

3. A system comprising:
at least one processor configured to execute software instructions, wherein the software instructions, upon execution, cause the at least one processor to perform steps to:
access an entry history data associated with a plurality of electronic activity performed by a plurality of users;
execute a recurring entry classifier model to generate a library of recognized recurring data entries based on feature vectors extracted from each data entry in the entry history data;
wherein each recognized recurring data entry in the library of recognized recurring data entries comprises:
i) a precursor period associated with a nominal electronic activity value associated with each recognized recurring data entry,
ii) a recurrence period associated with a recurring electronic activity value different from the nominal electronic activity value, and
iii) a recurring entity identifier identifying a recurring entity associated with each recognized recurring data entry;
wherein the precursor period of each recognized recurring data entry comprises an amount of time between a first data entry and a beginning of the recurrence period;
wherein the recurrence period comprises an amount of time between each recognized recurring data entry;
receive an electronic activity data entry associated with an electronic activity;
wherein the electronic activity data entry comprises:
i) an electronic activity date indicating a date of the electronic activity,
ii) an electronic activity value representing an amount of the electronic activity, and
iii) an entity identifier identifying an entity associated with the electronic activity;
identify the electronic activity data entry as a recurring data entry based on the electronic activity data entry and identify the electronic activity value as the nominal electronic activity value;
determine a matching sequence of recurring data entries in the library of recognized recurring data entries based at least in part on the entity identifier matching the recurring entity identifier of the matching sequence of recurring data entries;

determine a start date of the recurring data entry based on the precursor period of the matching sequence of recurring data entries and the electronic activity date of the electronic activity data entry;

cause to display a recurring entry graphical user interface (GUI) on a computing device associated with a user, the recurring entry GUI comprising:
   i) an indication of the recurring data entry, the precursor period, and the start date of the recurring data entry, and
   ii) a user selectable interface element to accept, decline or schedule future alerts of subsequent recurring data entries using the recurring data entries alert GUI; and execute a loss function to determine a loss of the recurring entry classifier model based on a difference between a particular recognized recurring data entry, the electronic activity data entry and a user selection of the user selectable interface element; and update model parameters of the when the loss of the recurring entry classifier model has been determined.

4. The systems and methods of any of clauses 1 through 3, wherein the electronic activity data entry is received from an authorized electronic activities stream.

5. The systems and methods of any of clauses 1 through 3, further comprising:
   determining, by the at least one processor, a candidate set of recurring data entries in the library by filtering the recognized recurring data entries in the library based on a comparison of the entity identifier to each recognized recurring data entries entity identifier; and
   determining, by the at least one processor, the subsequent recurring data entries by filtering the candidate set of recurring data entries based on a comparison of the electronic activity value to each recognized recurring data entries nominal value.

6. The systems and methods of any of clauses 1 through 3, further comprising cleansing, by the at least one processor, the entity identifier to produce a normalized entity identifier having a common format to each recognized recurring data entries entity identifier.

7. The systems and methods of any of clauses 1 through 3, further comprising:
   determining, by the at least one processor, an electronic activity value holding period comprising an amount of time between an authorization of the electronic activity value and a cancellation of the electronic activity value; and
   determining, by the at least one processor, the subsequent recurring data entries by filtering the candidate set of recurring data entries based on a comparison of the electronic activity value to each recognized recurring data entries nominal value and the electronic activity value holding period to a recognized recurring data entries nominal value holding period of each recognized recurring data entries nominal value.

8. The systems and methods of any of clauses 1 through 3, wherein the user selectable interface element comprises a confirmation element selectable by a user to confirm the precursor period and request a reminder.

9. The systems and methods of any of clauses 1 through 3, wherein the reminder comprises an alert message one day prior to an end of the precursor period.

10. The systems and methods of any of clauses 1 through 3, wherein the nominal electronic activity value comprises an authorized charge less than or equal to one dollars.

11. The systems and methods of any of clauses 1 through 3, further comprising:
   determining, by the at least one processor, a precursor identification delay upon receiving the electronic activity data entry; and
   determining, by the at least one processor, the nominal electronic activity value upon the precursor identification delay elapsing without a subsequent electronic activity data entry having the entity identifier and the electronic activity value.

12. The systems and methods of clause 9, wherein the precursor identification delay comprises fifteen minutes.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added, and/or any desired steps may be eliminated).

What is claimed is:

1. A method comprising:
   accessing, by at least one processor, electronic activities history data associated with a plurality of electronic activities performed by a plurality of users;
   executing, by the at least one processor, a recurring entry classifier model to generate a library of recognized recurring electronic activities based on feature vectors extracted from each electronic activity in the electronic activities history data;
      wherein each recognized recurring electronic activity in the library of recognized recurring electronic activities comprises:
         a recurrence period associated with a recurring electronic activity value, and
         a recurring entity identifier identifying a recurring entity associated with each recognized recurring electronic activity;
      wherein the recurrence period comprises an amount of time between each recognized recurring electronic activity;
   receiving, by the at least one processor, an electronic activity data entry associated with an electronic activity for at least one electronic service;
      wherein the electronic activity data entry comprises:
         i) an electronic activity date indicating a date of the electronic activity,
         ii) an electronic activity value representing an amount of the electronic activity, and
         iii) an entity identifier identifying an entity associated with the electronic activity;
   generating, by the at least one processor, using the recurring entry classifier model, a prediction of a matching sequence of recurring electronic activities in the library of recognized recurring electronic activities based at least in part on the entity identifier matching the recurring entity identifier of the matching sequence of recurring electronic activities;
   obtaining, by the at least one processor, at least one user selection, via at least one user selectable interface element, to correct the matching sequence of recurring electronic activities;
   automatically and iteratively retraining, by the at least one processor, the recurring entry classifier model based on a loss function applied to the matching sequence of recurring electronic activities and the user selection to produce a retrained recurring entry classifier model; and monitoring, by the at least one processor, for a particular user account, a plurality of other electronic activities associated with the particular user account to predict, using the retrained recurring entry classifier model, at least one other electronic activity as being a recurring data entry associated with the at least one electronic service;

wherein the particular user account comprises a configuration defining at least one action associated with proactively mitigating the at least one other electronic activity; and facilitating, by the at least one processor, in response to the at least one other electronic activity being identified as associated with the at least one electronic service, the at least one action associated with the proactively mitigating the at least one other recurring electronic activity for automated account integrity validation.

2. The method of claim 1, wherein the electronic activity data entry is received from an authorized electronic activities stream.

3. The method of claim 1, further comprising cleansing, by the at least one processor, the entity identifier to produce a normalized entity identifier having a common format to each recognized recurring data entries entity identifier.

4. The method of claim 1, wherein the user selectable interface element comprises a confirmation element selectable by a user to confirm a precursor period and request a reminder.

5. The method of claim 4, wherein the reminder comprises an alert message one day prior to an end of the precursor period.

6. The method of claim 1, wherein a first recurring electronic activity in the matching sequence of recurring electronic activities comprises a nominal electronic activity value comprising an authorized charge less than or equal to one dollars.

7. The method of claim 1, wherein the at least one action comprises fifteen minutes.

8. The method of claim 1, wherein the at least one action comprises a cancellation of the at least one other recurring electronic activity.

9. The method of claim 1, wherein the at least one action comprises at least one message to schedule at least one other instance of the at least one electronic service.

10. The method of claim 1, wherein the at least one action comprises triggering at least one security check configured to check security of the particular user account.

11. A method comprising:

receiving, by at least one processor, a plurality of electronic activity data entries associated with a plurality of electronic activities;

wherein each electronic activity data entry of the plurality of electronic activity data entries comprises:
i) an electronic activity date indicating a date,
ii) an electronic activity value representing an amount, and
iii) an entity identifier of an entity;

utilizing, by the at least one processor, a recurring entry classifier model to automatically predict at least one sequence of recurring electronic activity data entries by identifying a subset of electronic activity data entries of the plurality of electronic activity data entries having:

i) at least one common entity identifier of the at least one sequence of recurring electronic activity data entries,
ii) at least one common electronic activity value of the at least one sequence of recurring electronic activity data entries, and
iii) at least one common day of a month associated with each electronic activity date the at least one sequence of recurring electronic activity data entries;

wherein the recurring entry classifier model ingests feature vectors extracted from each data entry of the plurality of electronic activity data entries to automatically recognize the at least one sequence of recurring electronic activity data entries;

determining, by the at least one processor, at least one precursor electronic activity data entry associated with the at least one sequence of recurring electronic activity data entries based on an electronic activity data entry of the plurality of electronic activity data entries having a nominal electronic activity value;

wherein the at least one precursor electronic activity data entry comprises at least one preceding electronic activity date preceding the at least one sequence of recurring electronic activity data entries;

determining, by the at least one processor, a precursor period for the at least one sequence of recurring electronic activity data entries based on an amount of time between the at least one preceding electronic activity date and at least one first electronic activity date of at least one first electronic activity data entry in the at least one sequence of recurring electronic activity data entries;

monitoring, by the at least one processor, for a particular user account, a plurality of other electronic activities associated with the particular user account;

predict, by the at least one processor, using the recurring entry classifier model, at least one other electronic activity as being a recurring data entry associated with at least one electronic service;

wherein the particular user account comprises a configuration defining at least one action associated with proactively mitigating the at least one other electronic activity; and facilitating, by the at least one processor, in response to the at least one other electronic activity being identified as associated with the at least one electronic service, the at least one action associated with the proactively mitigating the at least one other recurring electronic activity for automated account integrity validation.

12. The method of claim 11, wherein each electronic activity data entry in plurality of electronic activity data entries is received from an authorized electronic activities stream.

13. The method of claim 11, further comprising cleansing, by the at least one processor, each entity identifier to produce a normalized entity identifier for each entity identifier having a common format.

14. The method of claim 11, wherein the at least one action comprises an alert message one day prior to an end of the precursor period.

15. The method of claim 11, wherein each nominal electronic activity value comprises an authorized charge less than or equal to one dollars.

16. The method of claim 11, wherein the at least one first electronic activity value comprises a first nominal value.

17. The method of claim 11, wherein the at least one action comprises a cancellation of the at least one other recurring electronic activity.

18. The method of claim 11, wherein the at least one action comprises at least one message to schedule at least one other instance of the at least one electronic service.

19. The method of claim 11, wherein the at least one action comprises triggering at least one security check configured to check security of the particular user account.

20. A system comprising:
- at least one processor configured to execute software instructions, wherein the software instructions, upon execution, cause the at least one processor to perform steps to:
  - access electronic activities history data associated with a plurality of electronic activities performed by a plurality of users;
  - execute a recurring entry classifier model to generate a library of recognized recurring electronic activities based on feature vectors extracted from each electronic activity of the plurality of electronic activities in the electronic activities history data;
    - wherein each recognized recurring electronic activities in the library of recognized recurring electronic activities comprises:
      - a recurrence period associated with a recurring electronic activity value, and
      - a recurring entity identifier identifying a recurring entity associated with each recognized recurring electronic activity;
      - wherein the recurrence period comprises an amount of time between each recognized recurring electronic activity;
  - receive electronic activity data associated with an electronic activity for at least one electronic service;
    - wherein the electronic activity data comprises:
      - i) an electronic activity date indicating a date of the electronic activity,
      - ii) an electronic activity value representing an amount of the electronic activity, and
      - iii) an entity identifier identifying an entity associated with the electronic activity;
  - generate, using the recurring entry classifier model, a prediction of a matching sequence of recurring electronic activities in the library of recognized recurring electronic activities based at least in part on the entity identifier matching the recurring entity identifier of the matching sequence of recurring electronic activities;
  - obtain at least one user selection, via at least one user selectable interface element, to confirm or deny the matching sequence of recurring electronic activities;
  - automatically and iteratively retrain the recurring entry classifier model based on a loss function applied to the matching sequence of recurring electronic activities and the user selection to produce a retrained recurring entry classifier model;
  - monitor, for a particular user account, a plurality of other electronic activities associated with the particular user account to predict, using the retrained recurring entry classifier model, at least one other electronic activity as being a recurring data entry associated with the at least one electronic service;
    - wherein the particular user account comprises a configuration defining at least one action associated with proactively mitigating the at least one other electronic activity; and
  - facilitate, in response to the at least one other electronic activity being identified as associated with the at least one electronic service, the at least one action associated with the proactively mitigating the at least one other recurring electronic activity for automated account integrity validation.

\* \* \* \* \*